(12) United States Patent
Hayashi

(10) Patent No.: US 10,753,329 B2
(45) Date of Patent: *Aug. 25, 2020

(54) SUCTION FILTER AND FUEL SUPPLY DEVICE

(71) Applicant: DENSO CORPORATION, Kariya, Aichi-pref. (JP)

(72) Inventor: Norihiro Hayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 281 days.

This patent is subject to a terminal disclaimer.

(21) Appl. No.: 15/745,762

(22) PCT Filed: Jun. 29, 2016

(86) PCT No.: PCT/JP2016/003111
§ 371 (c)(1),
(2) Date: Jan. 18, 2018

(87) PCT Pub. No.: WO2017/017894
PCT Pub. Date: Feb. 2, 2017

(65) Prior Publication Data
US 2018/0209386 A1    Jul. 26, 2018

(30) Foreign Application Priority Data

Jul. 29, 2015  (JP) ................................ 2015-150012
Dec. 9, 2015   (JP) ................................ 2015-240569

(51) Int. Cl.
*F02M 37/22*     (2019.01)
*F02M 37/10*     (2006.01)
(Continued)

(52) U.S. Cl.
CPC ............. *F02M 37/22* (2013.01); *B01D 29/13* (2013.01); *B01D 35/02* (2013.01); *F02M 37/10* (2013.01); *F02M 37/106* (2013.01); *F02M 37/50* (2019.01)

(58) Field of Classification Search
None
See application file for complete search history.

(56) References Cited

U.S. PATENT DOCUMENTS 1,568,796 A  *  1/1926  Carl ................... F04B 53/1037
                                                210/130
1,773,134 A  *  8/1930  Fisher ................ F04B 53/1037
                                                210/167.02
(Continued)

FOREIGN PATENT DOCUMENTS

JP    H06-063323    3/1994
JP    2006-029317   2/2006
(Continued)

*Primary Examiner* — Robert J Popovics
(74) *Attorney, Agent, or Firm* — Nixon & Vanderhye PC

(57) ABSTRACT

A filter element is installed in an inside of a fuel tank to filter stored fuel by passing the stored fuel into an inside space through the filter element. A partition wall element is exposed in the inside space. The partitioning portion includes: a partitioning portion that is placed to partially partition the inside space into a first space, into which filtered fuel filtered through the filter element is supplied, and a second space, in which a suction inlet for suctioning the filtered fuel opens, wherein the partitioning portion conducts the filtered fuel from the first space to the second space; and a communication window that is formed in the partitioning portion at a location, which is offset to a side that is away from the suction inlet, wherein the communication window communicates between the first space and the second space while bypassing the partitioning portion.

9 Claims, 11 Drawing Sheets

(51) Int. Cl.
*F02M 37/50* (2019.01)
*B01D 29/13* (2006.01)
*B01D 35/02* (2006.01)

(56) References Cited

U.S. PATENT DOCUMENTS

| | | | | |
|---|---|---|---|---|
| 1,800,585 | A * | 4/1931 | Woolson | B01D 35/027 210/167.02 |
| 2,424,211 | A * | 7/1947 | Webb | B01D 35/0273 210/461 |
| 3,295,297 | A * | 1/1967 | Collins | A61M 1/3627 96/155 |
| 3,875,059 | A * | 4/1975 | Maschino | B01D 29/114 210/172.3 |
| 4,561,977 | A | 12/1985 | Sasaki | |
| 4,966,522 | A * | 10/1990 | Koyama | B01D 35/027 415/121.2 |
| 5,049,267 | A * | 9/1991 | Sasaki | B01D 29/114 210/172.3 |
| 5,111,844 | A * | 5/1992 | Emmert | F02M 37/106 123/514 |
| 5,395,520 | A | 3/1995 | Ito et al. | |
| 5,409,608 | A * | 4/1995 | Yoshida | B01D 29/15 210/315 |
| 6,638,423 | B2 * | 10/2003 | Dockery | B01D 35/0273 210/132 |
| 7,087,160 | B2 * | 8/2006 | Beer | B01D 35/0273 156/580.1 |
| 7,901,572 | B2 * | 3/2011 | Sato | B01D 35/0273 210/172.4 |
| 8,038,877 | B2 * | 10/2011 | Stausberg | B01D 29/52 184/6.24 |
| 8,137,546 | B2 * | 3/2012 | Ogose | B01D 35/0273 210/172.4 |
| 8,173,013 | B2 * | 5/2012 | Sato | B01D 35/0273 210/172.4 |
| 8,246,819 | B2 * | 8/2012 | Sakata | B01D 29/111 156/272.8 |
| 8,372,278 | B1 * | 2/2013 | Nguyen | B01D 35/0273 123/196 A |
| 8,496,812 | B2 * | 7/2013 | Beer | F01M 11/0004 210/167.03 |
| 8,673,141 | B2 * | 3/2014 | Stausberg | B01D 35/0273 210/172.4 |
| 9,441,586 | B2 * | 9/2016 | Akagi | F02M 37/103 |
| 9,567,955 | B2 * | 2/2017 | Akagi | F02M 37/103 |
| 9,573,085 | B2 * | 2/2017 | Beer | F01M 11/0004 |
| 9,816,470 | B2 * | 11/2017 | Nishio | F02M 37/10 |
| 9,957,931 | B2 * | 5/2018 | Kobayashi | F02M 37/02 |
| 10,145,341 | B2 * | 12/2018 | Kim | F02M 37/14 |
| 10,267,276 | B2 * | 4/2019 | Nishio | F02M 37/10 |
| 10,436,161 | B2 * | 10/2019 | Kim | F02M 37/14 |
| 2003/0042185 | A1 * | 3/2003 | Dockery | B01D 35/0273 210/132 |
| 2004/0237485 | A1 * | 12/2004 | Beer | B01D 35/0273 55/379 |
| 2005/0274361 | A1 | 12/2005 | Ikeya | |
| 2006/0076287 | A1 | 4/2006 | Catlin et al. | |
| 2007/0151906 | A1 * | 7/2007 | Beer | B01D 35/0273 210/130 |
| 2007/0199546 | A1 | 8/2007 | Tomomatsu et al. | |
| 2008/0290013 | A1 * | 11/2008 | Stausberg | B01D 29/52 210/167.04 |
| 2009/0114578 | A1 * | 5/2009 | Pekarsky | B01D 35/0273 210/123 |
| 2009/0134088 | A1 * | 5/2009 | Morishita | F16H 57/0404 210/451 |
| 2009/0230049 | A1 * | 9/2009 | Stausberg | B01D 35/0273 210/416.5 |
| 2009/0250410 | A1 * | 10/2009 | Khalil | B01D 35/0273 210/767 |
| 2009/0294343 | A1 * | 12/2009 | Pekarsky | B01D 29/05 210/167.08 |
| 2009/0301954 | A1 * | 12/2009 | Beer | F01M 11/0004 210/167.08 |
| 2010/0038296 | A1 * | 2/2010 | Beer | F01M 11/0004 210/167.03 |
| 2011/0192786 | A1 * | 8/2011 | Nagai | F02M 37/50 210/443 |
| 2018/0209386 | A1 * | 7/2018 | Hayashi | F02M 37/10 |

FOREIGN PATENT DOCUMENTS

| | | |
|---|---|---|
| JP | 2011-163198 | 8/2011 |
| JP | 2012-067736 | 4/2012 |
| JP | 2017-020486 | 1/2017 |
| JP | 2017-048778 | 3/2017 |
| WO | WO 2016/114132 | 7/2016 |
| WO | WO 2017/038234 | 3/2017 |

\* cited by examiner

SUCTION FILTER AND FUEL SUPPLY DEVICE

CROSS REFERENCE TO RELATED APPLICATION

This application is the U.S. national phase of International Application No. PCT/JP2016/003111, filed on Jun. 29, 2016, which designated the U.S. and claims priority to Japanese Patent Application No. 2015-150012 filed on Jul. 29, 2015 and Japanese Patent Application No. 2015-240569 filed on Dec. 9, 2015, the entire contents of each of which are hereby incorporated by reference.

TECHNICAL FIELD

The present disclosure relates to a suction filter and a fuel supply device having the suction filter.

BACKGROUND ART

Previously, in a fuel supply device, which supplies fuel from an inside of a fuel tank of a vehicle to an outside of the fuel tank, a fuel pump, which is placed in the inside of the fuel tank, suctions the fuel into a suction inlet of the fuel pump and discharges the suctioned fuel to the outside of the fuel tank. The patent literature 1 discloses the above described type of fuel supply device. A suction filter is provided in this fuel supply device to suction the fuel into a suction inlet of the fuel pump after filtering the fuel through the suction filter in the fuel tank.

The suction filter, which is disclosed in the patent literature 1, includes a filter element that is placed in the inside of the fuel tank. Stored fuel, which is stored in the fuel tank, is passed into an inside space of the filter element through an outside surface of the filter element, so that the stored fuel is filtered through the filter element while a liquid film of the fuel is formed at the outside surface of the filter element. Here, the liquid film is maintained at the filter element as long as the outside surface of the filter element contacts the stored fuel. In the suction filter of the patent literature 1, an outside space of the filter element is partially covered with a storage member in the inside of the fuel tank. In this way, even in a case where the stored fuel is pulled to one side in the fuel tank to cause tilting of a surface of the stored fuel at the time of, for example, turning of the vehicle and thereby to cause separation of the surface of the stored fuel away from the filter element, a portion of the outside surface of the filter element can maintain contact with the fuel that is captured between the storage member and the filter element. Therefore, at the filter element that can be kept under the state, in which the formation of the liquid film is maintained, the fuel can be kept to be dominant as a suction subject to be suctioned into the inside space, in which the suction inlet opens.

However, in the suction filter of the patent literature 1, an inflow hole is formed at the storage member to supply the fuel at the space between the filter element and the storage member through the inflow hole. Therefore, at the time of, for example, turning the vehicle, the fuel, which is captured between the filter element and the storage member, can be easily leaked from the inflow hole in response to the tilting of the surface of the fuel. When the amount of the captured fuel, which is captured between the filter element and the storage member, is decreased, the captured fuel may possibly be depleted within a short period of time in response to progress of the suctioning of the fuel into the suction inlet. Thereby, the air may possibly be suctioned into the suction inlet. The suctioning of the air into the suction inlet causes a change in the discharge performance of the fuel pump and is thereby not desirable.

Furthermore, in the suction filter of the patent literature 1, the filter element is covered with the storage member, so that the surface area of the filter element becomes small. Thereby, when a pore size of pores of the filter element is reduced to improve the filtering function, a ratio of a clogged area, in which the pores of the filter element are clogged by foreign objects, tends to be increased at the surface of the filter element. Therefore, at the fuel pump, there is a possibility of deteriorating the stability of the discharge performance due to the clogging of the pores of the filter element.

CITATION LIST

Patent Literature

Patent Literature 1: JP2012-67736A

SUMMARY OF INVENTION

The present disclosure is made in view of the above disadvantage, and it is an objective of the present disclosure to provide a suction filter, which can stabilize a discharge performance of a fuel pump, and a fuel supply device that includes the suction filter.

According to a first aspect, which is disclosed to address the above objective, there is provided a suction filter for filtering fuel in an inside of a fuel tank of a vehicle and thereafter enabling suctioning of the filtered fuel into a suction inlet of a fuel pump, the suction filter including:

a filter element to be installed in the inside of the fuel tank to filter stored fuel, which is stored in the fuel tank, by passing the stored fuel into an inside space of the filter element; and a partition wall element that is exposed in the inside space, wherein the partition wall element includes:

a partitioning portion that is placed to partially partition the inside space into a first space, into which filtered fuel filtered through the filter element is supplied, and a second space, in which the suction inlet for suctioning the filtered fuel opens, wherein the partitioning portion conducts the filtered fuel from the first space to the second space through the partitioning portion; and a communication window that is formed in the partitioning portion at a location, which is offset to a side that is away from the suction inlet, wherein the communication window communicates between the first space and the second space while bypassing the partitioning portion.

Furthermore, according to a second aspect, which is disclosed to address the above objective, there is provided a fuel supply device for supplying fuel from an inside of a fuel tank of a vehicle to an outside of the fuel tank, the fuel supply device including: a fuel pump that discharges fuel, which is suctioned into a suction inlet in the inside of the fuel tank, toward the outside of the fuel tank; and the suction filter of the first aspect discussed above.

According to the and second aspects, at the filter element, which is placed in the inside of the fuel tank, a liquid film is formed by passing the stored fuel from the inside of the fuel tank to the inside space. Therefore, even when the stored fuel is pulled to one side in the fuel tank to cause tilting of the surface of the stored fuel at the time of, for example, turning of the vehicle and thereby to cause separation of the surface of the stored fuel away from the filter element, it is possible to limit leakage of the fuel from the inside space.

Furthermore, the partitioning portion of the partition wall element according to the first and second aspects partially partitions the inside space of the filter element into the first space, into which the filtered fuel at the filter element is supplied, and the second space, in which the suction inlet of the fuel pump opens. Here, the liquid film is formed at the partitioning portion by passing the filtered fuel from the first space into the second space, so that the filtered fuel can be captured in the first space defined between the partitioning portion and the filter element, at which the liquid film of the fuel is formed as discussed above. Furthermore, at this time, the communication window, which is formed at the partitioning portion of the partition wall element, does not interfere with the liquid film formation at the partitioning portion and the capturing of the fuel at the first space as long as the communication window is immersed in the filtered fuel.

Thereby, according to the first and second aspects, even in the case where the tilting of the surface of the stored fuel occurs in the fuel tank, the communication window, which is offset to the side that is away from the suction inlet, is likely placed in the state where the communication window is immersed in the filtered fuel in the first space. Therefore, the filtered fuel of the first space can maintain the contact with the surface of the partitioning portion located on the first space side under the state where the sufficient amount of filtered fuel is kept captured in the first space by limiting the leakage of the filtered fuel through the filter element. As a result, at the partition wall element that can be kept under the state, in which the formation of the liquid film is maintained, the fuel can be kept to be dominant as a suction subject to be suctioned into the second space, in which the suction inlet opens. Accordingly, suctioning of the air into the suction inlet can be continuously limited by effectively using the filtered fuel of the first space, so that a discharge performance of the fuel pump can be stabilized.

Also, according to the first and second aspects, at the filter element, which has a large surface area due to the provision of the inside space partitioned by the partitioning portion, a ratio of a clogged area, which is clogged with foreign objects to limit suctioning of the stored fuel, relative to the entire surface area of the filter element is less likely to increase even when the pore size of the filter element is reduced to increase the filtering function. Furthermore, the communication window of the first and second aspects communicates between the first space and the second space while bypassing the partitioning portion. Thus, even if the pores of the partitioning portion, which has a small surface area due to the partitioning of the inside space with the partitioning portion, are clogged, the filtered fuel of the first space can be suctioned into the second space through the communication window and can be thereby effectively used. Accordingly, it is possible to limit deterioration of the stability of the discharge performance, which would be caused by the clogging of the filter element and the partition wall element.

DESCRIPTION OF EMBODIMENTS

Hereinafter, embodiments of the present disclosure will be described with reference to accompanying drawings. In the following respective embodiments, corresponding components will be indicated by the same reference sings and will not be described redundantly for the sake of simplicity in some cases. In the following respective embodiments, in a case where only a portion(s) of a structure is described, the rest of the structure may be the same as that of a previously described embodiment(s). Furthermore, besides a combination of components explicitly described in the following respective embodiments, the components of some of the embodiments may be combined together even when such a combination is not explicitly described.

First Embodiment

Figure 1:
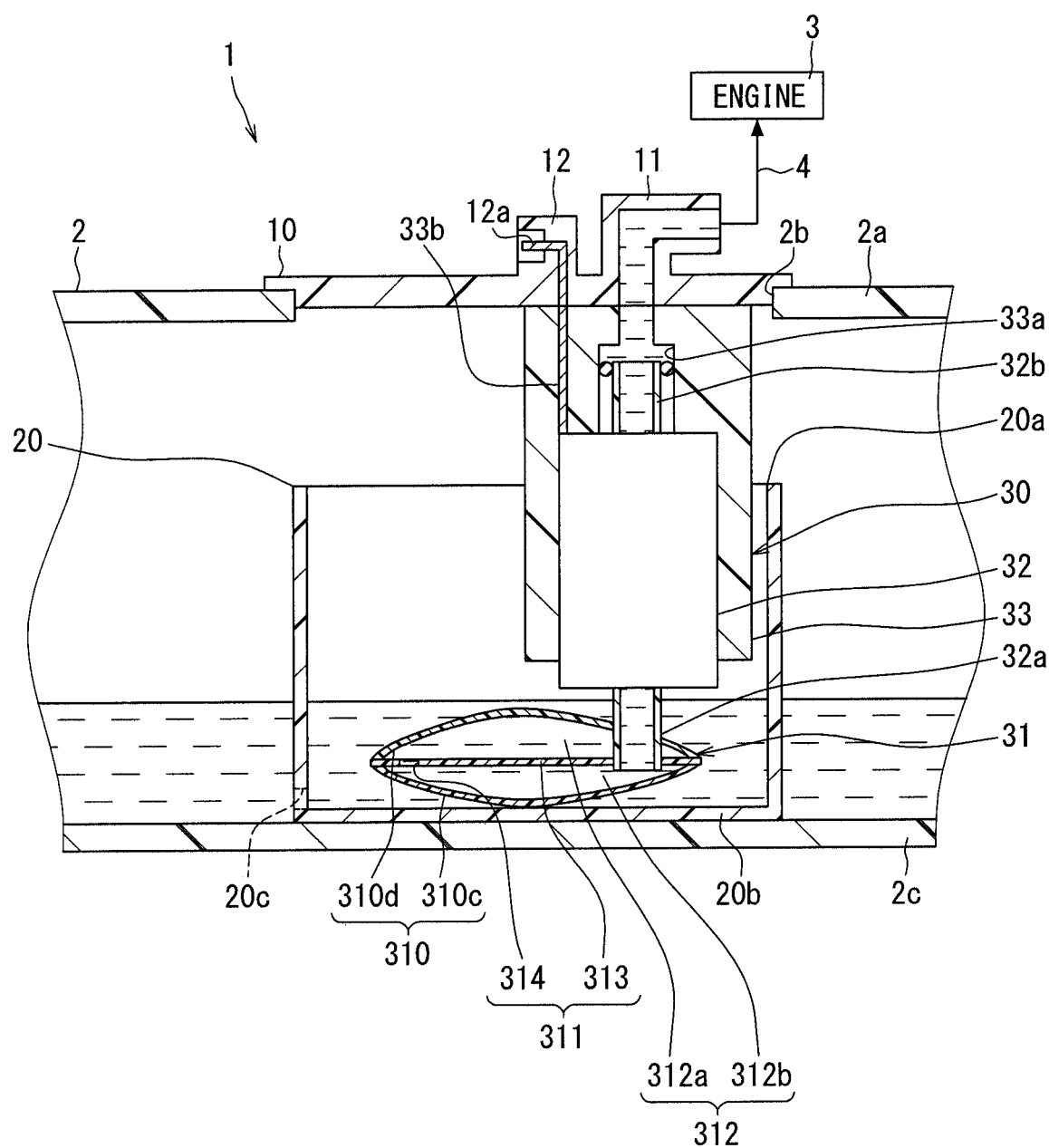
FIG. 1 is a cross-sectional view of a fuel supply device according to a first embodiment.

As shown in FIG. 1, a fuel supply device 1 of a first embodiment of the present disclosure is installed at a fuel tank 2 of a vehicle. The device 1 supplies the fuel from the fuel tank 2 to an internal combustion engine 3 located at an outside of the fuel tank 2. Here, the fuel tank 2, at which the device 1 is installed, is made of resin and is shaped into a hollow form to store the fuel to be supplied to the internal combustion engine 3. The internal combustion engine 3, which receives the fuel from the device 1, may be a gasoline engine or a diesel engine. A horizontal direction and a vertical direction of the vehicle placed on a horizontal plane respectively coincide with a lateral direction and a top-to-bottom direction at FIG. 1.

(Overall Structure)

First of all, an overall structure of the device 1 will be described.

The device 1 includes a flange 10, a sub-tank 20 and a pump unit 30.

The flange 10 is made of a rigid resin and is shaped into a circular disk form. The flange 10 is installed to a ceiling plate portion 2a of the fuel tank 2. The flange 10 closes a through-hole 2b that penetrates through the ceiling plate portion 2a.

The flange 10 includes a fuel supply pipe 11 and an electrical connector 12, which are formed integrally with the flange 10. The fuel supply pipe 11 is communicated with a pump unit 30 in an inside of the fuel tank 2. Also, the fuel supply pipe 11 is communicated with a fuel path 4 located between the fuel supply pipe 11 and the internal combustion engine 3 at the outside of the fuel tank 2. The fuel supply pipe 11, which is communicated in the above-described manner, supplies the fuel, which is suctioned by a fuel pump 32 of the pump unit 30 at the inside of the fuel tank 2, toward the internal combustion engine 3 located at the outside of the fuel tank 2. Metal terminals 12a are embedded in the electrical connector 12. The metal terminals 12a are electrically connected to the pump unit 30 at the inside of the fuel tank 2. Also, the metal terminals 12a are electrically connected to an external control circuit at the outside of the fuel tank 2. Because of the above-described electrical configuration, the fuel pump 32 of the pump unit 30 can be controlled by the external control circuit.

The sub-tank 20 is made of rigid resin and is shaped into a bottomed cylindrical tubular form. The sub-tank 20 is placed in the inside of the fuel tank 2 while an opening portion 20a of the sub-tank 20 is directed upwardly. A bottom portion 20b of the sub-tank 20 is placed on a bottom portion 2c of the fuel tank 2. A flow inlet 20c penetrates through the sub-tank 20 at a location adjacent to the bottom portion 20b. Because of the form of penetration described above, fuel (hereinafter simply referred to as "stored fuel"), which is stored in the fuel tank 2, flows into the sub-tank 20 through the flow inlet 20c.

The pump unit 30 is configured to be placed at both of the inside and the outside of the sub-tank 20 at the inside of the fuel tank 2. The pump unit 30 includes a suction filter 31, the fuel pump 32 and a passage member 33.

The suction filter 31 is configured into a flat form. The suction filter 31 is received in the inside of the fuel tank 2 and is placed on the bottom portion 20b in the inside of the sub-tank 20. The suction filter 31 filters the stored fuel, which enters the sub-tank 20 in the inside of the fuel tank 2, to capture foreign objects contained in the fuel.

The fuel pump 32 is an electric pump that is shaped into a cylindrical form. The fuel pump 32 is received in the inside of the fuel tank 2 and extends from a location, which is above the suction filter 31 in the inside of the sub-tank 20, to the outside of the sub-tank 20. A suction inlet 32a of the fuel pump 32 is communicated with the suction filter 31. The external control circuit controls the fuel pump 32 to operate the fuel pump 32. When the fuel pump 32 is operated, the fuel pump 32 suctions the fuel (hereinafter simply referred to as "filtered fuel"), which is filtered by the suction filter 31 in the inside of the sub-tank 20 through the suction inlet 32a at the inside of the fuel tank 2. The filtered fuel, which is suctioned into the suction inlet 32a, is pressurized in the inside of the fuel pump 32 and is discharged from a discharge outlet 32b of the fuel pump 32 toward the internal combustion engine 3 located at the outside of the fuel tank 2.

The passage member 33 is made of rigid resin and is shaped into a hollow form. The passage member 33 is received in the inside of the fuel tank 2 and is fixed to the flange 10 such that the passage member 33 extends from a location around the fuel pump 32 to the outside of the sub-tank 20. The passage member 33 forms a fuel passage 33a that is communicated with the discharge outlet 32b and the fuel supply pipe 11. The fuel passage 33a supplies the fuel, which is discharged from the discharge outlet 32b of the fuel pump 32, toward the internal combustion engine 3 through the fuel supply pipe 11. Metal lead wires 33b are embedded in the passage member 33 to electrically connect the fuel pump 32 to the metal terminals 12a.

(Detailed Structure of Suction Filter)

Figure 2:
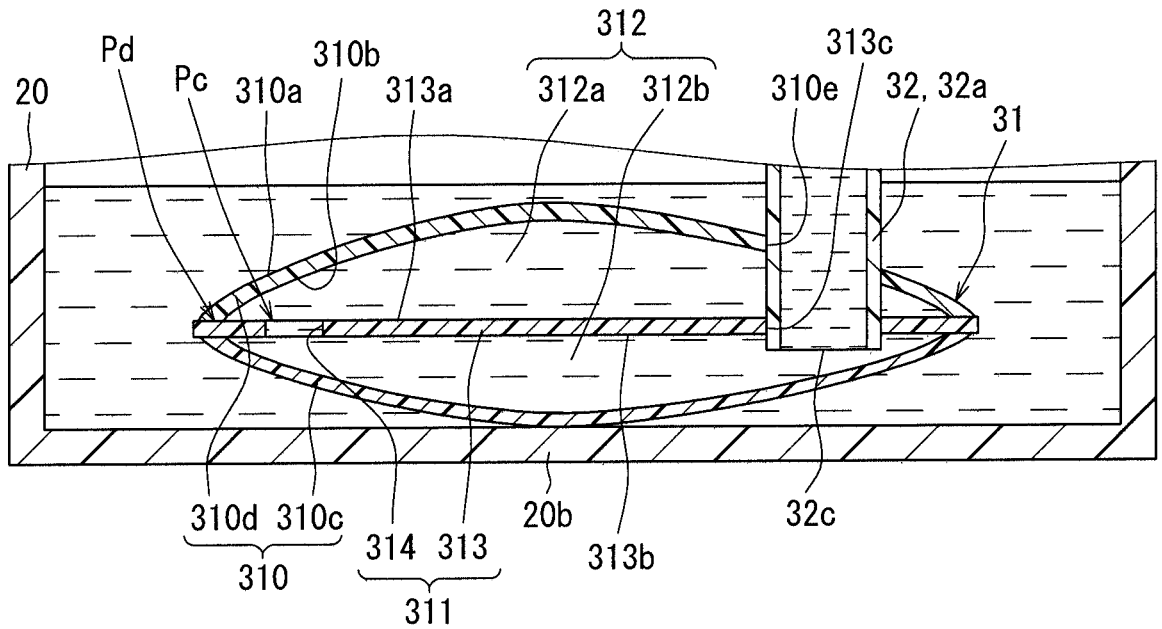
FIG. 2 is an enlarged cross-sectional view of a suction filter according to the first embodiment.

Next, the structure of the suction filter 31 will be described in detail. As shown in FIGS. 1 and 2, the suction filter 31 includes a filter element 310 and a partition wall element 311, which are combined together.

As shown in FIG. 2, the filter element 310 is shaped into a hollow bag form such that an outside surface 310a of the filter element 310 is exposed to the inside of the sub-tank 20, and an inside surface 310b of the filter element 310 surrounds an inside space 312 defined therein. The filter element 310 is formed such that a pair of filter sheets 310c, 310d is joined together along outer peripheral edge parts of the filter sheets 310c, 310d in a liquid-tight manner.

Here, each of the filter sheets 310c, 310d is shaped into a soft or right curved form and is made of a material, such as porous resin, woven fabric, non-woven fabric, resin mesh, or metal mesh, which implements the filtering function. For example, a pore size of each of the filter sheets 310c, 310d is set to enable capturing of fine foreign objects, which have an outer diameter that is equal to or larger than 10 μm, as the foreign objects contained in the stored fuel conducted from the inside of the fuel tank 2 into the inside of the sub-tank 20.

In the filter element 310, the upper filter sheet 310d, which is joined to the upper side of the lower filter sheet 310c, has a through-hole 310e. The suction inlet 32a of the fuel pump 32 extends from the outside of the filter element 310 into the inside space 312 through the through-hole 310e. The through-hole 310e is joined to the suction inlet 32a in a liquid-tight manner at a location that is on an upper side of an opening portion 32c of the suction inlet 32a, which faces downward. Because of the above-described form of penetration and the above-described form of joint, the upper filter sheet 310d of the filter element 310 is supported by the fuel tank 2 through the pump unit 30 and the flange 10, as shown in FIGS. 1 and 2. Thereby, a portion of the lower filter sheet 310c of the filter element 310 is in contact with the bottom portion 20b of the sub-tank 20.

The filter element 310, which is configured in the above-described manner, implements the filtering function by capturing the foreign objects at passing points of the stored fuel where the stored fuel passes at the time of conducting the stored fuel, which is supplied from the inside of the fuel tank 2 into the inside of the sub-tank 20, to the inside space 312. At this time, the passing points of the stored fuel are gaps defined by fine pores in the case where the material of the filter element 310 is the porous resin, gaps defined between fibers in the case where the material of the filter element 310 is the woven fabric or the non-woven fabric, or gaps defined between meshes in the case where the material of the filter element 310 is the resin mesh or the metal mesh. Therefore, the stored fuel is captured by the surface tension at the gaps of the passing points described above, so that a liquid film, which covers the outside surface 310a of the filter element 310, is formed simultaneously with implementation of the filtering function. Specifically, the filter element 310 implements the filtering function for filtering the stored fuel while the liquid film is formed at the outside surface 310a. Furthermore, the pore size of the filter element 310 is set to, for example, about 10 μm as a minimum size of the gaps at the passing points in order to capture the foreign objects, which have the outer diameter described above, at the passing points of the stored fuel.

In contrast to the filter element 310 described above, the partition wall element 311 is arranged to be exposed in the inside space 312 of the filter element 310 at the inside of the sub-tank 20 in the fuel tank 2 shown in FIGS. 1 and 2. Specifically, the partition wall element 311 has a partitioning portion 313 and a communication window 314.

The partitioning portion 313 is arranged in a form of a diaphragm that partially partitions the inside space 312 of the filter element 310 to form a first space 312a, which is placed at an upper side, and a second space 312b, which is placed at a lower side. As shown in FIG. 2, the partitioning portion 313 is joined between the outer peripheral edge part of the filter sheet 310c and the outer peripheral edge part of the filter sheet 310d along the entire perimeter of the partitioning portion 313, and thereby the partitioning portion 313 is formed in a form of a flat film that is under tension. With the above-described form of joint, the first space 312a is surrounded by the partitioning portion 313 and the upper filter sheet 310d, so that the upper surface 313a of the partitioning portion 313 is exposed in the first space 312a. Also, the second space 312b is surrounded by the partitioning portion 313 and the lower filter sheet 310c, so that the lower surface 313b of the partitioning portion 313 is exposed in the second space 312b. Thereby, the upper surface 313a and the lower surface 313b are also referred to as a first space side surface and a second space side surface, respectively.

The partitioning portion 313 is shaped into a soft or right flat film form and is made of a material, such as porous resin, woven fabric, non-woven fabric, resin mesh, or metal mesh, which implements the filtering function. Furthermore, a pore size of the partitioning portion 313 is set to be equal to or larger than the pore size of the respective filter sheets 310c, 310d, so that the foreign objects, which pass through the filter element 310, can also pass through the partitioning portion 313. Furthermore, the partitioning portion 313 partitions the inside space 312 of the filter element 310 such that in an imaginary state where the communication window 314 is plugged to have a thickness that is the same as a thickness of a surrounding region of the partitioning portion 313, which is located at an outer periphery of the communication window 314, a volume of the second space 312b is smaller than a volume of the first space 312a.

The partitioning portion 313 has a through-hole 313c. The suction inlet 32a of the fuel pump 32 extends from the first space 312a, which is located on the upper side of the partitioning portion 313, to the second space 312b, which is located on the lower side of the partitioning portion 313, through the through-hole 313c. The through-hole 313c is liquid-tightly joined to the suction inlet 32a on the upper side of the opening portion 32c of the suction inlet 32a, which opens to the second space 312b. Because of the above-described form of penetration and the above-described form of joint, the upper filter sheet 310d of the filter element 310 is supported by the fuel tank 2 through the pump unit 30 and the flange 10, as shown in FIGS. 1 and 2. The opening portion 32c of the suction inlet 32a is offset to the upper side of the second space 312b and is thereby spaced away from the lower filter sheet 310c toward the upper side, so that the opening portion 32c of the suction inlet 32a is less likely to suction the lower filter sheet 310c even under the influence of the suction pressure.

The partitioning portion 313, which is configured in the above-described manner, conducts the filtered fuel, which is filtered by the upper filter sheet 310d of the filter element 310 and is supplied to the first space 312a placed at the upper side, to the second space 312b placed at the lower side where the suction inlet 32a opens. At this time, the passing points of the filtered fuel are gaps, each of which is defined by a corresponding one of fine pores in the case where the material of the partition wall element 311 is the porous resin, gaps, each which is defined between corresponding fibers in the case where the material of the partition wall element 311 is the woven fabric or the non-woven fabric, or gaps, each of which is defined between corresponding meshes in the case where the material of the filter element 310 is the resin mesh or the metal mesh. Therefore, the filtered fuel is captured by the surface tension at the gaps of the passing points described above, so that a liquid film, which covers the upper surface 313a of the partition wall element 311, is formed. Furthermore, the pore size of the partitioning portion 313 is set to, for example, about 10 to 100 μm as a minimum size of the gaps at the passing points of the filtered fuel to permit the penetration of the foreign objects through the partitioning portion 313 at the passing points of the filtered fuel. Furthermore, the filtered fuel, which is filtered through the lower filter sheet 310c of the filter element 310, can directly flow into the second space 312b without passing through the partitioning portion 313.

The communication window 314 penetrates through the partitioning portion 313 in the top-to-bottom direction at one specific part Pc in a form of, for example, a cylindrical hole or a rectangular hole. The communication window 314 is arranged at a corresponding location that is offset toward the side, which is away from the opening portion 32c of the suction inlet 32a of the fuel pump 32 in the lateral direction. Specifically, the communication window 314 is placed at the corresponding location that is closer to a farthest part Pd of the joint portion, at which the partitioning portion 313 and the filter sheets 310c, 310d are joined together, in comparison to the opening portion 32c in the lateral direction while the farthest part Pd is farthest from opening portion 32c in the lateral direction. The communication window 314 opens toward the first space 312a, which is located on the upper side of the partitioning portion 313, and also opens toward the second space 312b, which is located on the lower side of the partitioning portion 313. With the form of opening described above, the communication window 314 communicates between the first space 312a and the second space 312b while bypassing the partitioning portion 313. Thereby, the portion of the inside space 312 of the filter element 310, which is other than the communicating part Pc formed by the communication window 314, is partitioned into the first space 312a and the second space 312b by the partitioning portion 313.

Effects and Advantages

Hereinafter, effects and advantages of the first embodiment described above will be described.

According to the first embodiment, at the filter element 310, which is placed in the inside of the fuel tank 2, the stored fuel, which passes through the filter element 310 from the inside of the fuel tank 2 to the inside space 312, forms the liquid film. Therefore, leakage of the stored fuel from the inside space 312 can be limited even when the surface of the stored fuel is tilted and is spaced away from the filter element 310 due to the pulling of the stored fuel toward one side in the sub-tank 20 in the fuel tank 2 as shown in FIG. 3 at the time of, for example, turning of the vehicle.

Furthermore, the partitioning portion 313 of the partition wall element 311 of the first embodiment partially partitions the inside space 312 between the first space 312a, into which the fuel filtered through the filter element 310 is supplied, and the second space 312b, in which the suction inlet 32a of the fuel pump 32 opens. The liquid film is formed at the partitioning portion 313 by passing the filtered fuel from the first space 312a into the second space 312b, so that as shown in FIG. 3, the filtered fuel can be captured in the first space 312a defined between the partitioning portion 313 and the filter element 310, at which the liquid film of the fuel is formed as discussed above. Furthermore, at this time, the communication window 314, which is formed at the partitioning portion 313 of the partition wall element 311, does not interfere with the liquid film formation at the partitioning portion 313 and the capturing of the fuel at the first space 312a as long as the communication window 314 is immersed in the filtered fuel.

Figure 3:
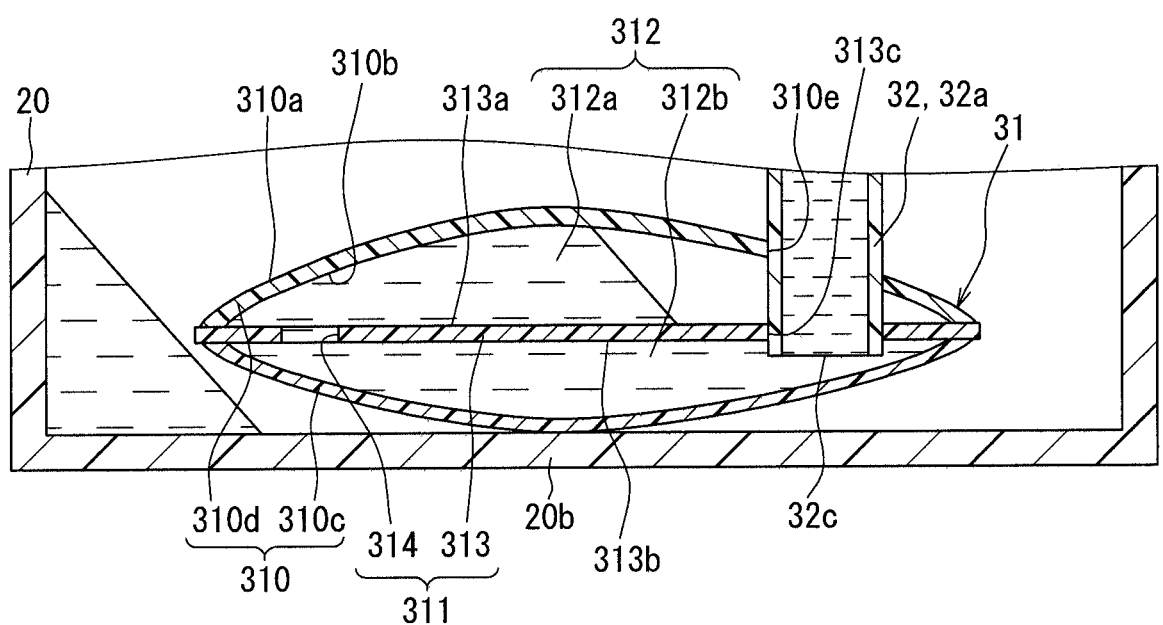
FIG. 3 is a cross-sectional view for describing effects and advantages of the suction filter according to the first embodiment.

Because of this phenomenon, according to the first embodiment, even in the case where the tilting of the surface of the stored fuel occurs in the sub-tank 20 placed in the fuel tank 2, the communication window 314, which is offset to the side that is away from the suction inlet 32a, is likely placed in the state where the communication window 314 is immersed in the filtered fuel in the first space 312a, as shown in FIG. 3. Therefore, as shown in FIG. 3, the filtered fuel of the first space 312a can maintain the contact with the upper surface 313a of the partitioning portion 313 located on the first space 312a side under the state where the sufficient amount of filtered fuel is kept captured in the first space 312a by limiting the leakage of the filtered fuel through the filter element 310. As a result, at the partition wall element 311 that can be kept under the state, in which the formation of the liquid film is maintained, the fuel can be kept to be dominant as a suction subject to be suctioned into the second space 312b, in which the suction inlet 32a opens. Accordingly, suctioning of the air into the suction inlet 32a can be continuously limited by effectively using the filtered fuel of the first space 312a, so that a discharge performance of the fuel pump 32 can be stabilized. Furthermore, in the first embodiment, in which the fuel discharged from the fuel pump 32 is supplied to the internal combustion engine 3 located at the outside of the fuel tank 2, by stabilizing the discharge performance of the fuel pump 32, the drivability and the acceleration of the vehicle can be ensured, and the fuel starvation and the engine stop can be limited.

Also, in the first embodiment, at the filter element 310, which has a large surface area due to the provision of the space 312 partitioned by the partitioning portion 313, a ratio of a clogged area, which is clogged with the foreign objects to limit suctioning of the stored fuel, relative to the entire surface area of the filter element 310 is less likely to increase even when the pore size of the filter element 310 is reduced to increase the filtering function. Additionally, in the first embodiment, the communication window 314 communicates between the first space 312a and the second space 312b while bypassing the partitioning portion 313. Thus, even if the pores of the partitioning portion 313, which has a small surface area due to the partitioning of the space 312 with the partitioning portion 313, are clogged, the filtered fuel of the first space 312a can be suctioned into the second space 312b through the communication window 314 and can be thereby effectively used. Accordingly, it is possible to limit deterioration of the stability of the discharge performance, which would be caused by the clogging of the filter element 310 and the partition wall element 311.

Furthermore, the partitioning portion 313, which is arranged in the form of the diaphragm, partially partitions the inside space 312 of the filter element 310 into the first space 312a placed at the upper side and the second space 312b placed at the lower side. Thereby, in the sub-tank 20 placed in the fuel tank 2, the formation of the liquid film at the partitioning portion 313 is maintained to enable the accumulation of the filtered fuel in the second space 312b until the surface of the stored fuel drops and reaches the second space 312b upon decreasing of the stored fuel. In this way, the suctioning of the air into the suction inlet 32a can be continuously limited in a reliable manner, and thereby the stability of the discharge performance of the fuel pump 32 can be increased.

Additionally, at the partitioning portion 313 of the first embodiment, the pore size of the pores, through which the filtered fuel passes, is set to be equal to or larger than the pore size of the pores, through which the stored fuel passes, at the filter element 310. Therefore, even at the partitioning portion 313, which has the smaller surface area in comparison to the filter element 310 due to the partitioning of the inside space 312 with the partitioning portion 313, it is possible to limit the clogging with the foreign objects, which are allowed to pass through the filter element 310. In this way, it is possible to improve the limiting effect for limiting the deterioration of the stability of the discharge performance of the fuel pump 32, which would be caused by the clogging of the partition wall element 311.

Furthermore, according to the first embodiment, in the imaginary state where the communication window 314 is plugged to have the thickness that is the same as the thickness of the surrounding region of the partitioning portion 313, which is located at the outer periphery of the communication window 314, the volume of the second space 312b is smaller than the volume of the first space 312a. Thereby, even when the filtered fuel of the first space 312a is depleted in response to the suctioning of the filtered fuel into the suction inlet 32a to cause suctioning of the air into the second space 312b, it is possible to reduce the amount of remaining filtered fuel, which remains in the second space 312b without being suctioned into the suction inlet 32a. This is due to the following reason. That is, when a volume fraction of the air in the second space 312b becomes equal to or larger than a predetermined value, only the air is suctioned into the suction inlet 32a while leaving the filtered fuel in the second space 312b. Thereby, the amount of the filtered fuel left in the second space 312b can be reduced by reducing the volume of the second space 312b. As a result, in the first embodiment, the stability of the discharge performance of the fuel pump 32 can be increased by effectively using the filtered fuel, which is captured in the second space 312b.

Second Embodiment

Figure 4:
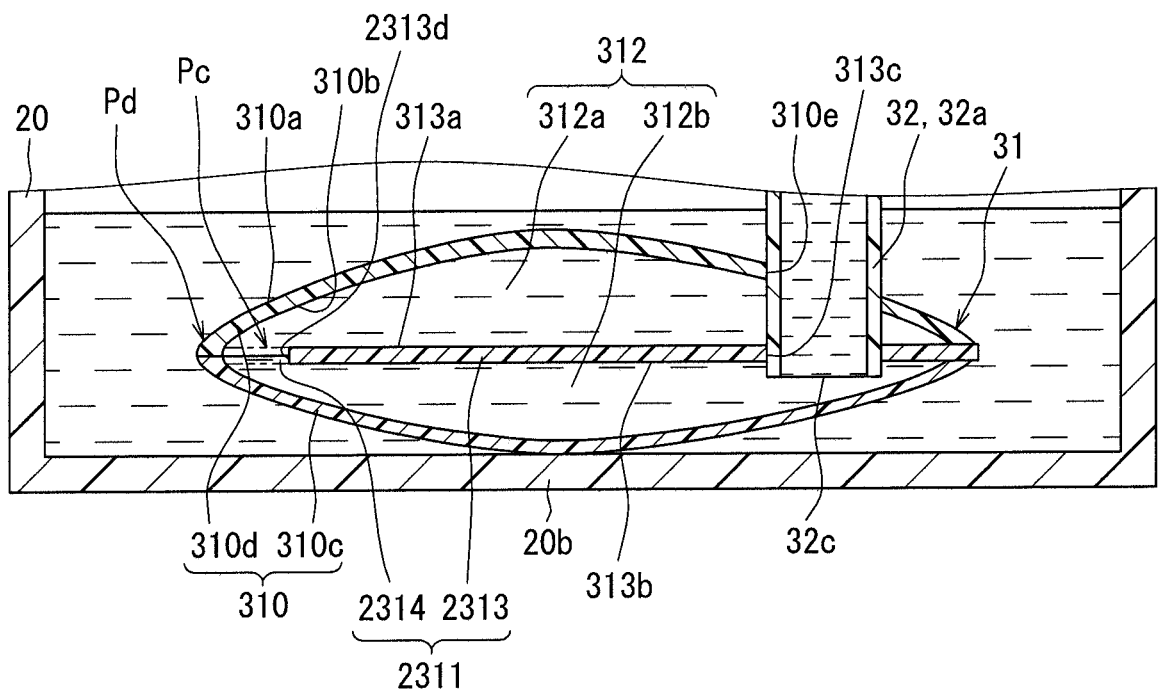
FIG. 4 is an enlarged cross-sectional view of a suction filter according to a second embodiment.

As shown in FIG. 4, a second embodiment of the present disclosure is a modification of the first embodiment.

A partitioning portion 2313 of a partition wall element 2311 of the second embodiment is joined between the outer peripheral edge parts of the filter sheets 310c, 310d except a corresponding circumferential region of the partitioning portion 2313, and thereby the partitioning portion 2313 is formed in a form of a flat film that is under tension. The partitioning portion 2313 has an unconnected edge part 2313d at one specific part Pc of the partitioning portion 2313 that is not joined to the filter sheets 310c, 310d. The unconnected edge part 2313d is spaced away from the farthest part Pd of the joint portion, at which the filter sheets 310c, 310d are joined together, toward the suction inlet 32a side of the fuel pump 32. The rest of the structure of the partitioning portion 2313, which is other than the above-described form of joint and the above-described form of spacing, is the same as that of the first embodiment.

Furthermore, the communication window 2314 of the partition wall element 2311 of the second embodiment is formed between the outer peripheral edge part of the farthest part Pd of the filter sheets 310c, 310d and the unconnected edge part 2313d of the partitioning portion 2313. Therefore, the communication window 2314 is arranged at a corresponding location that is offset toward the side, which is away from the opening portion 32c of the suction inlet 32a in the lateral direction, such that the communication window 2314 extends through the partitioning portion 2313 in the top-to-bottom direction. The rest of the structure of the communication window 2314, which is other than the above-described one, is the same as that of the first embodiment. Thereby, the portion of the inside space 312 of the filter element 310, which is other than the communicating part Pc formed by the communication window 2314, is partitioned into the first space 312a and the second space 312b by the partitioning portion 2313.

In the second embodiment described above, the partition wall element 2311, which includes the partitioning portion 2313 and the communication window 2314, can achieve the advantages, which are the same as those of the first embodiment.

Third Embodiment

Figure 5:
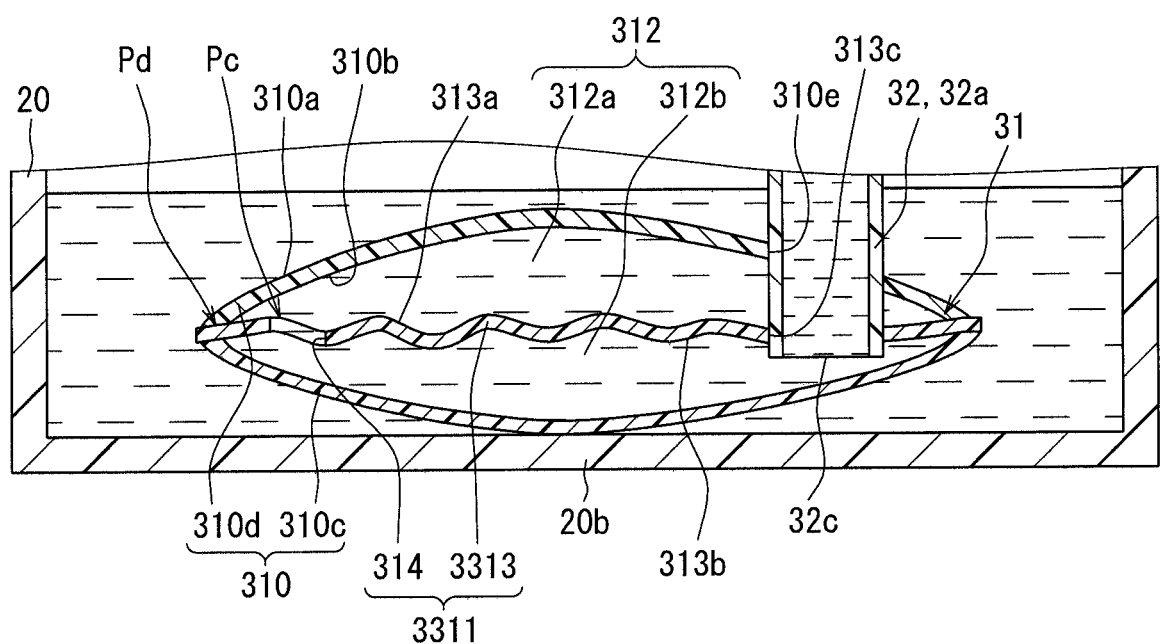
FIG. 5 is an enlarged cross-sectional view of a suction filter according to a third embodiment.

As shown in FIG. 5, a third embodiment of the present disclosure is a modification of the first embodiment.

The partitioning portion 3313 of the partition wall element 3311 of the third embodiment is formed into a form of a flexible soft diaphragm and is made of a material, such as porous resin, woven fabric, non-woven fabric, resin mesh, or metal mesh, which implements the filtering function. The partitioning portion 3313 is joined between the outer peripheral edge part of the filter sheet 310c and the outer peripheral edge part of the filter sheet 310d along an entire perimeter of the partitioning portion 3313, and thereby the partitioning portion 3313 is arranged into a relaxed state in a wavy form that enables expansion and contraction of the second space 312b. The rest of the structure of the partition wall element 3311, which is other than the above-described flexibility and the above-described relaxed state of the partition wall element 3311, is the same as that of the first embodiment. Thereby, the portion of the inside space 312 of the filter element 310, which is other than the communicating part Pc formed by the communication window 314, is partitioned into the first space 312a and the second space 312b by the partitioning portion 3313.

Figure 6:
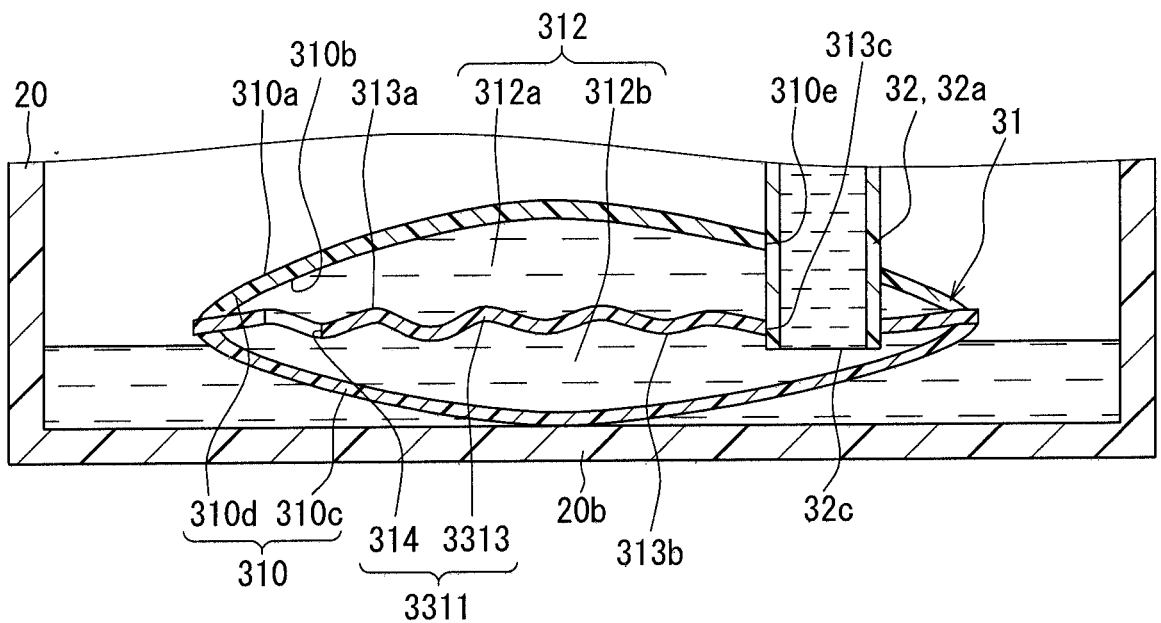
FIG. 6 is a cross-sectional view showing the suction filter of FIG. 5 in a state that is different from the state of the suction filter shown in FIG. 5.

The principle of expansion and contraction of the second space 312b by the partition wall element 3311, which is constructed in the above-described manner, is as follows. As shown in FIGS. 5 and 6, in the sub-tank 20 placed in the fuel tank 2, as long as at least the lower filter sheet 310c of the filter element 310 is kept in contact with the stored fuel, the inside space 312 is filled with the filtered fuel. At this time, the second space 312b is kept in an expanded state, in which the volume of the second space 312b is expanded, by spacing a majority of the partitioning portion 3313, which is other than the outer peripheral edge part of the partitioning portion 3313, away from the lower filter sheet 310c. At this time, in the imaginary state where the communication window 314 of the partitioning portion 3313 is plugged to have the thickness that is the same as the thickness of the surrounding region of the partitioning portion 3313, which is located at the outer periphery of the communication window 314, the volume of the second space 312b may be set to any one of the followings: the volume of the second space 312b is larger than the volume of the first space 312a; and the volume of the second space 312b is smaller than the volume of the first space 312a.

Figure 7:
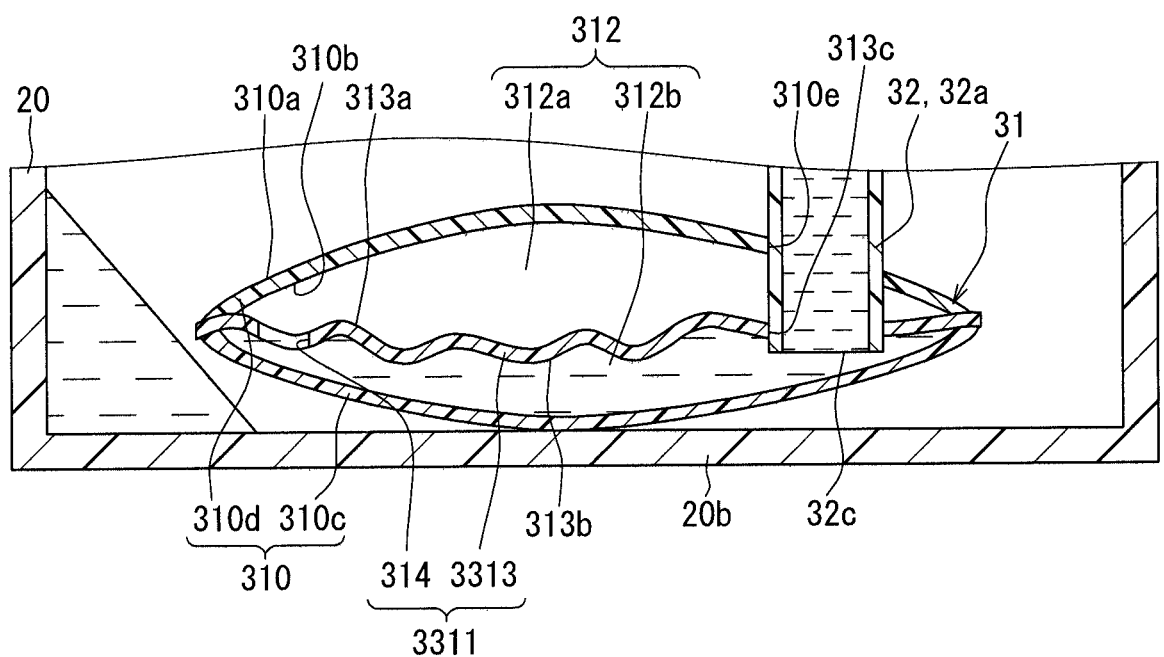
FIG. 7 is a cross-sectional view for describing effects and advantages of the suction filter according to the third embodiment.

In contrast, as shown in FIG. 7, in the case where the tilting of the surface of the stored fuel occurs in the sub-tank 20 placed in the fuel tank 2, the filtered fuel of the first space 312a passes through the partitioning portion 3313 or the communication window 314 in response to the suctioning through the suction inlet 32a, and thereby substantial depletion of the fuel in the first space 312a may possibly occur. At this time, the partitioning portion 3313 progressively approaches the lower filter sheet 310c in response to the suctioning through the suction inlet 32a, so that the volume of the second space 312b is progressively reduced. At this time, in the imaginary state where the communication window 314 of the partitioning portion 3313 is plugged to have the thickness that is the same as the thickness of the surrounding region of the partitioning portion 3313, which is located at the outer periphery of the communication window 314, the volume of the second space 312b becomes smaller than the volume of the first space 312a due to the progressive reduction of the volume of the second space 312b.

According to the third embodiment, the partitioning portion 3313 of the partition wall element 3311, which has the flexibility and is placed in the relaxed state, enables the expansion and contraction of the second space 312b. Therefore, even when the filtered fuel of the first space 312a is substantially depleted in response to the suctioning of the filtered fuel into the suction inlet 32a, the second space 312b is contracted by the amount, which corresponds to the amount of the filtered fuel that is suctioned from the second space 312b into the suction inlet 32a. Accordingly, it is possible to limit suctioning of the air from the first space 312a into the suction inlet 32a through the partitioning portion 3313 or the communication window 314 or suctioning of the air from the outside of the filter element 310 into the suction inlet 32a. Therefore, it is possible to limit the suctioning of the air into the suction inlet 32a by effectively using the filtered fuel that is captured in the second space 312b, so that the stability of the discharge performance of the fuel pump 32 can be increased. Furthermore, according to the third embodiment, advantages, which are similar to those of the first embodiment, can be achieved.

Fourth Embodiment

Figure 8:
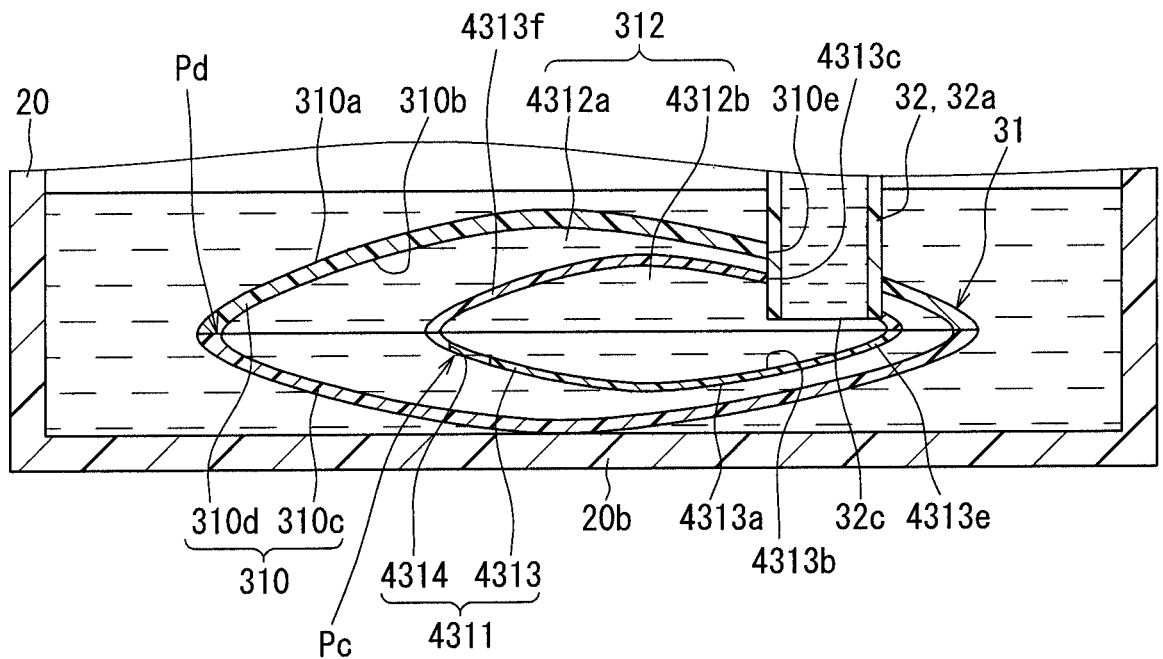
FIG. 8 is an enlarged cross-sectional view of a suction filter according to a fourth embodiment.

As shown in FIG. 8, a fourth embodiment of the present disclosure is a modification of the first embodiment.

A partitioning portion 4313 of a partition wall element 4311 of the fourth embodiment is shaped into a hollow bag form such that an outside surface 4313a of the partitioning portion 4313 is exposed to the first space 4312a in the inside space 312 of the filter element 310, and an inside surface 4313b of the partitioning portion 4313 surrounds the second space 4312b. A pair of partition wall sheets 4313e, 4313f of the partitioning portion 4313 are joined together along outer peripheral edge parts of the partition wall sheets 4313e, 4313f in a liquid-tight manner, so that the partitioning portion 4313 cooperates with the filter element 310 to cover the first space 4312a. Here, the partition wall sheets 4313e, 4313f, which form the partitioning portion 4313, is made of the material that is exemplified in the first embodiment as the material of the partitioning portion 313, so that the partitioning portion 4313 has the pore size that is the same as that of the first embodiment.

The upper partition wall sheet 4313f of the partitioning portion 4313, which is joined to the upper side of the lower partition wall sheet 4313e of the partitioning portion 4313, has a through-hole 4313c. The suction inlet 32a of the fuel pump 32 is inserted through the through-hole 4313c from the first space 4312a, which is located at the outside of the partitioning portion 4313, into the second space 4312b, which is located at the inside of the partitioning portion 4313. The through-hole 4313c is liquid-tightly joined to the suction inlet 32a on the upper side of the opening portion 32c of the suction inlet 32a, which opens to the second space 4312b. Because of the above-described form of penetration and the above-described form of joint, the partitioning portion 4313 is supported by the fuel tank 2 through the pump unit 30 and the flange 10, so that the entirety of the lower partition wall sheet 4313e is spaced away from the lower filter sheet 310c of the filter element 310 toward the upper side. The opening portion 32c of the suction inlet 32a is offset to the upper side of the second space 4312b and is thereby spaced away from the lower partition wall sheet 4313e toward the upper side, so that the opening portion 32c of the suction inlet 32a is less likely to suction the lower partition wall sheet 4313e even under the influence of the suction pressure.

The partitioning portion 4313, which is configured in the above-described manner, conducts the filtered fuel, which is filtered by the filter sheets 310c, 310d of the filter element 310 and is supplied to the first space 4312a placed at the outside of the partitioning portion 4313, to the second space 4312b placed at the inside of the partitioning portion 4313, in which the suction inlet 32a opens. At this time, the passing points of the filtered fuel are the gaps of the filter element 310, which correspond to the material of the filter element 310. Therefore, the filtered fuel is captured by the surface tension at the passing points, so that a liquid film, which covers the outside surface 4313a of the partitioning portion 4313, is formed. Furthermore, the pore size of the partition wall sheets 4313e, 4313f is set to, for example, about 10 to 100 μm as a minimum size of the gaps at the passing points of the filtered fuel to permit the penetration of the foreign objects, which are similar to the foreign objects of the first embodiment.

The communication window 4314 of the partition wall element 4311 of the fourth embodiment penetrates through the lower partition wall sheet 4313e of the partitioning portion 4313 in the top-to-bottom direction at one specific part Pc in a form of, for example, a cylindrical hole or a rectangular hole. The rest of the structure of the communication window 4314, which is other than the above-described one, is similar to that of the first embodiment. Thereby, the portion of the inside space 312 of the filter element 310, which is other than the communicating part Pc formed by the communication window 314, is partitioned into the first space 4312a and the second space 4312b by the partitioning portion 4313.

As described above, the partitioning portion 4313 of the partition wall element 4311 of the fourth embodiment partially partitions the inside space 312 of the filter element 310 into the first space 4312a, into which the filtered fuel is supplied, and the second space 4312b, in which the suction inlet 32a opens. Here, the filtered fuel, which passes from the first space 4312a to the second space 4312b, forms the liquid film at the partitioning portion 4313. Therefore, as shown in FIG. 9, the filtered fuel can be captured in the first space 4312a, which is formed between the partitioning portion 4313 and the filter element 310 that has the liquid film like in the first embodiment.

Furthermore, at this time, the communication window 4314, which is formed at the partitioning portion 4313 of the partition wall element 4311, does not interfere with the liquid film formation at the partitioning portion 4313 and the capturing of the fuel at the first space 4312a as long as the communication window 4314 is immersed in the filtered fuel.

Figure 9:
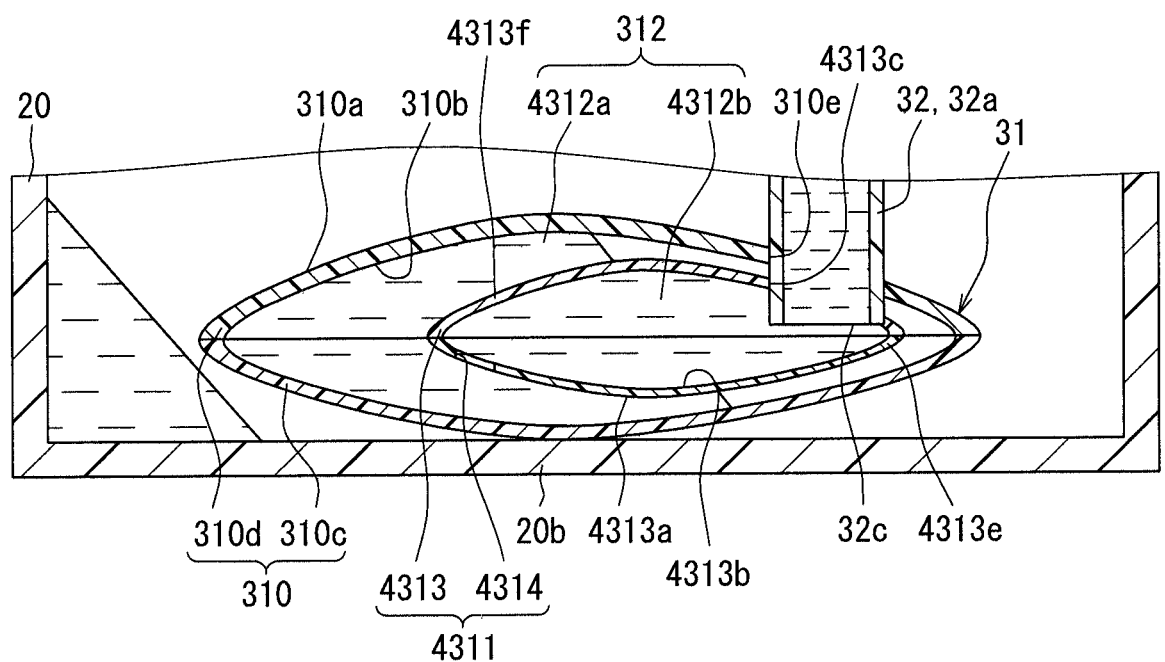
FIG. 9 is a cross-sectional view for describing effects and advantages of the suction filter according to the fourth embodiment.

Because of this phenomenon, according to the fourth embodiment, even in the case where the tilting of the surface of the stored fuel occurs in the sub-tank 20 placed in the fuel tank 2, the communication window 4314, which is offset to the side that is away from the suction inlet 32a, is likely placed in the state where the communication window 4314 is immersed in the filtered fuel in the first space 4312a, as shown in FIG. 9. Therefore, as shown in FIG. 9, the filtered fuel of the first space 4312a can maintain the contact with the outside surface 4313a of the partitioning portion 4313 located on the first space 4312a side under the state where the sufficient amount of filtered fuel is kept captured in the first space 4312a by limiting the leakage of the filtered fuel through the filter element 310. Therefore, according to the principle, which is similar to the principle of the first embodiment, even in the fourth embodiment, since the discharge performance of the fuel pump 32 can be stabilized, the drivability and the acceleration of the vehicle can be ensured, and the fuel starvation and the engine stop can be limited.

Furthermore, the partitioning portion 4313, which is shaped into the bag form (serving as the hollow form) as in the fourth embodiment, surrounds the second space 4312b, which is located at the inside of the partitioning portion 4313, while the partitioning portion 4313 is exposed to the first space 4312a located at the outside of the partitioning portion 4313. In this way, the surface area of the outside surface 4313a of the partitioning portion 4313, which is exposed to the first space 4312a, is increased as much as possible. Thereby, even when the surface of the fuel in the sub-tank 20 placed in the fuel tank 2 is tilted to cause a reduction in the filtered fuel of the first space 312a in response to the suctioning of the fuel into the suction inlet 32a, the formation of the liquid film at the partitioning portion 4313 can be maintained by limiting separation of the partitioning portion 4313 from the filtered fuel in the first space 4312a. Thus, the suctioning of the air into the suction inlet 32a can be continuously limited in a reliable manner, and thereby the stability of the discharge performance of the fuel pump 32 can be increased.

Even in the fourth embodiment, the pore size of the partitioning portion 4313 is set to be equal to or larger than the pore size of the filter element 310. Therefore, the clogging of the foreign objects at the partitioning portion 4313 can be limited according to the principle that is the same as the principle of the first embodiment. As a result, it is possible to improve the limiting effect for limiting the occurrence of a reduction in the stability of the discharge performance of the fuel pump 32, which would be caused by the clogging of the partitioning portion 4313.

Fifth Embodiment

Figure 10:
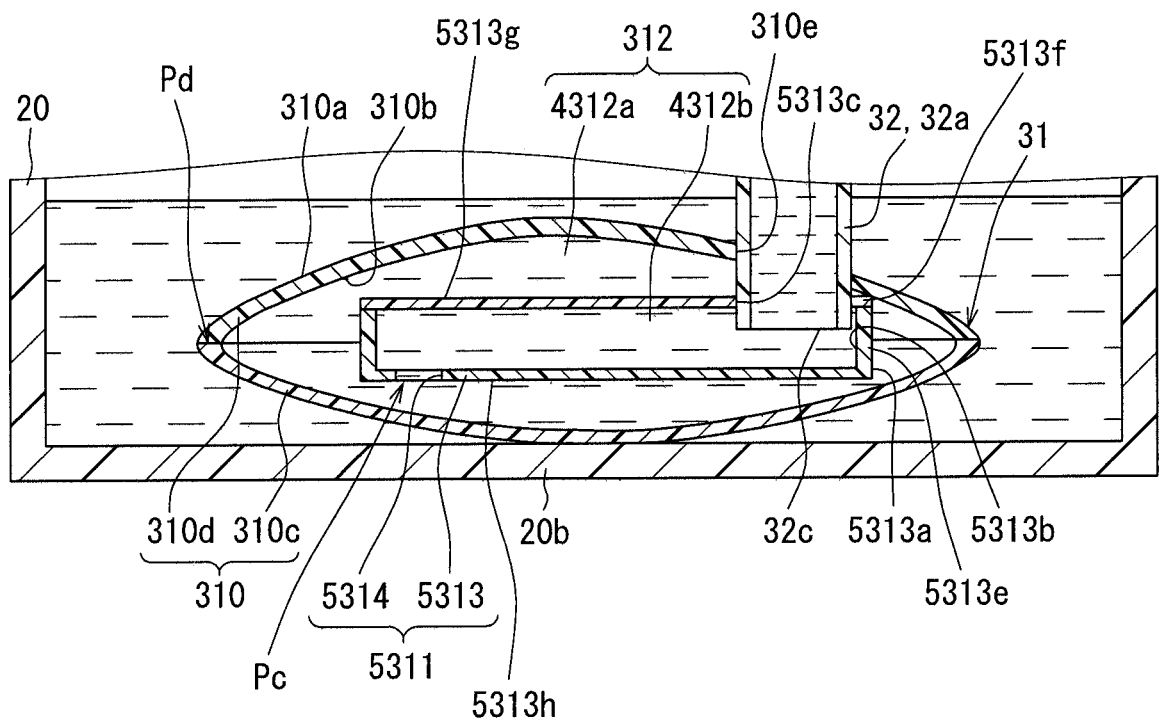
FIG. 10 is an enlarged cross-sectional view of a suction filter according to a fifth embodiment.

As shown in FIG. 10, a fifth embodiment of the present disclosure is a modification of the fourth embodiment.

A partitioning portion 5313 of a partition wall element 5311 according to the fifth embodiment is formed into a hollow tubular form such that an outside surface 5313a of the partitioning portion 5313 is exposed to the first space 4312a of the inside space 312 of the filter element 310, and an inside surface 5313b of the partitioning portion 5313 surrounds the second space 4312b. The partitioning portion 5313 is formed by joining a pair of partition wall members 5313e, 5313f together in a liquid tight manner such that an upper wall 5313g and a lower wall 5313h, which are substantially parallel to the bottom portion 2c, 20b of each tank 2, 30, are joined together by four walls, which are placed between the upper wall 5313g and a lower wall 5313h, to form the partitioning portion 5313 in a rectangular tubular form. Here, each of the partition wall members 5313e, 5313f of the partitioning portion 5313 is made of the material, which is the same as the material that is exemplified as the material of the partitioning portion 313 in the first embodiment, so that each of the partition wall members 5313e, 5313f has the pore size that is substantially the same as that of the first embodiment.

At the partitioning portion 5313, the upper partition wall member 5313f, which is joined to an upper side of a lower partition wall member 5313e, has a through-hole 5313c. The suction inlet 32a of the fuel pump 32 is inserted through the through-hole 5313c from the first space 4312a, which is located at the outside of the partitioning portion 4313, into the second space 4312b, which is located at the inside of the partitioning portion 4313. The through-hole 5313c is joined to the suction inlet 32a in a liquid-tight manner at a location that is on the upper side of the opening portion 32c of the suction inlet 32a. Because of the above-described form of penetration and the above-described form of joint, the partitioning portion 5313 is supported by the fuel tank 2 through the pump unit 30 and the flange 10, so that the entirety of the lower partition wall member 5313e is spaced away from the lower filter sheet 310c of the filter element 310 toward the upper side. Furthermore, the opening portion 32c of the suction inlet 32a is offset to the upper side of the second space 4312b and is thereby spaced away from the lower partition wall member 5313e toward the upper side, so that the opening portion 32c of the suction inlet 32a is less likely to suction the lower wall 5313h of the lower partition wall member 5313e even under the influence of the suction pressure.

The partitioning portion 5313, which is configured in the above-described manner, conducts the filtered fuel, which is filtered by the filter sheets 310c, 310d of the filter element 310 and is supplied to the first space 4312a placed at the outside of the partitioning portion 5313, to the second space 4312b placed at the inside of the partitioning portion 5313, in which the suction inlet 32a opens. At this time, the passing points of the filtered fuel are the gaps of the filter element 310, which correspond to the material of the filter element 310. Therefore, the filtered fuel is captured by the surface tension at the passing points, so that a liquid film, which covers the outside surface 5313a of the partitioning portion 5313, is formed. Furthermore, the pore size of the partition wall members 5313e, 5313f is set to, for example, about 10 to 100 μm as a minimum size of the gaps at the passing points of the filtered fuel to permit the penetration of the foreign objects, which are similar to the foreign objects of the first embodiment.

The communication window 5314 of the partition wall element 5311 of the fifth embodiment penetrates through the lower partition wall member 5313e of the partitioning portion 5313 in the top-to-bottom direction at one specific part Pc in a form of, for example, a cylindrical hole or a rectangular hole. The rest of the structure of the communication window 5314, which is other than the above-described one, is similar to that of the first embodiment. Thereby, the portion of the inside space 312 of the filter element 310, which is other than the communicating part Pc formed by the communication window 5314, is partitioned into the first space 4312a and the second space 4312b by the partitioning portion 5313.

In the fifth embodiment described above, the partition wall element 5311, which includes the partitioning portion 5313 formed into the tubular form (serving as the hollow form) and the communication window 5314, can achieve the advantages that are similar to those of the fourth embodiment.

Other Embodiments

Although the embodiments of the present disclosure have been described above, the present disclosure should not be interpreted strictly in view of the embodiments described above. That is, the present disclosure may be applied to various other embodiments and various combinations of the embodiments within a scope of the present disclosure.

Figure 11:
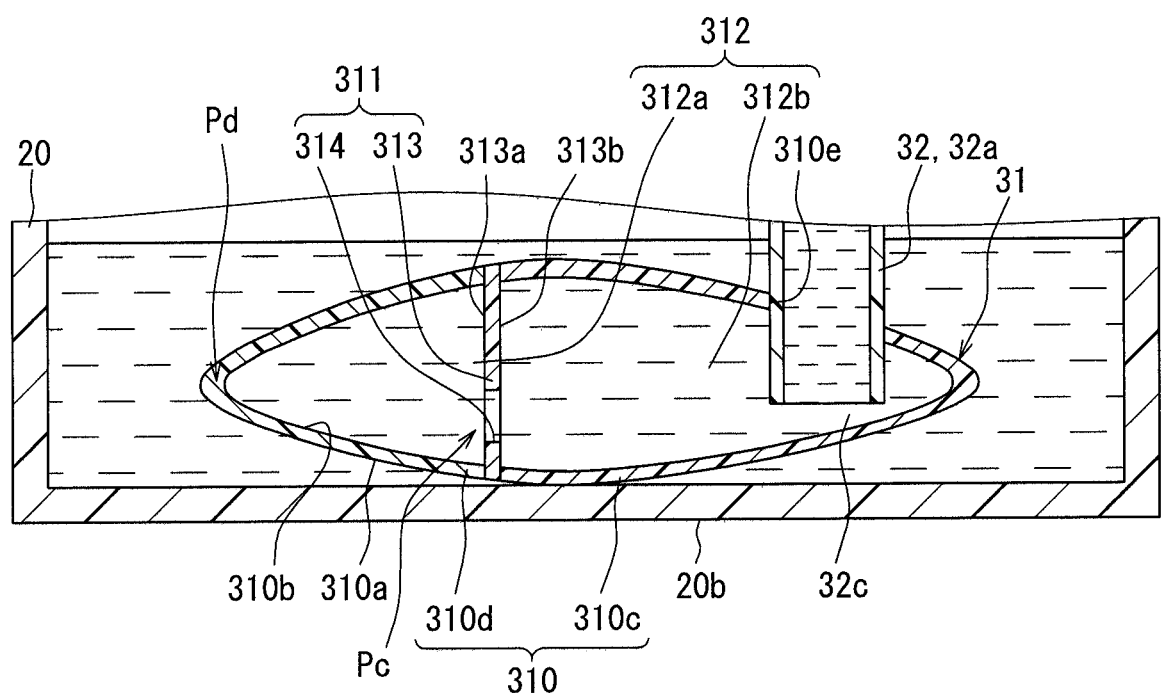
FIG. 11 is a cross-sectional view showing a modification of FIG. 2.

In a first modification, which relates to the first and second embodiments, as shown in FIG. 11, the inside space 312 may be partitioned into a space 312a and a space 312b in the lateral direction by a partitioning portion 313, 2313 that is in a form of a diaphragm that does not have the through-hole 313c. In this first modification, the filter element 310 is formed by joining the filter sheets 310c, 310d in the lateral direction, and the partitioning portion 313, 2313 is joined between the outer peripheral edge parts of the filter sheets 310c, 310d. Also, in the first modification, the partitioning portion 313, 2313 is offset toward the side, which is away from the opening portion 32c of the suction inlet 32a in the lateral direction, so that the communication window 314, 2314 is also offset toward the side, which is away from the opening portion 32c of the suction inlet 32a in the lateral direction. Therefore, according to the first modification, in the imaginary state where the communication window 314 of the partitioning portion 313, 2313 is plugged to have the thickness that is the same as the thickness of the surrounding region of the partitioning portion 313, 2313, which is located at the outer periphery of the communication window 314, the volume of the first space 312a is smaller than the volume of the second space 312b. Here, it should be noted that FIG. 11 shows the first modification of the first embodiment.

Figure 12:
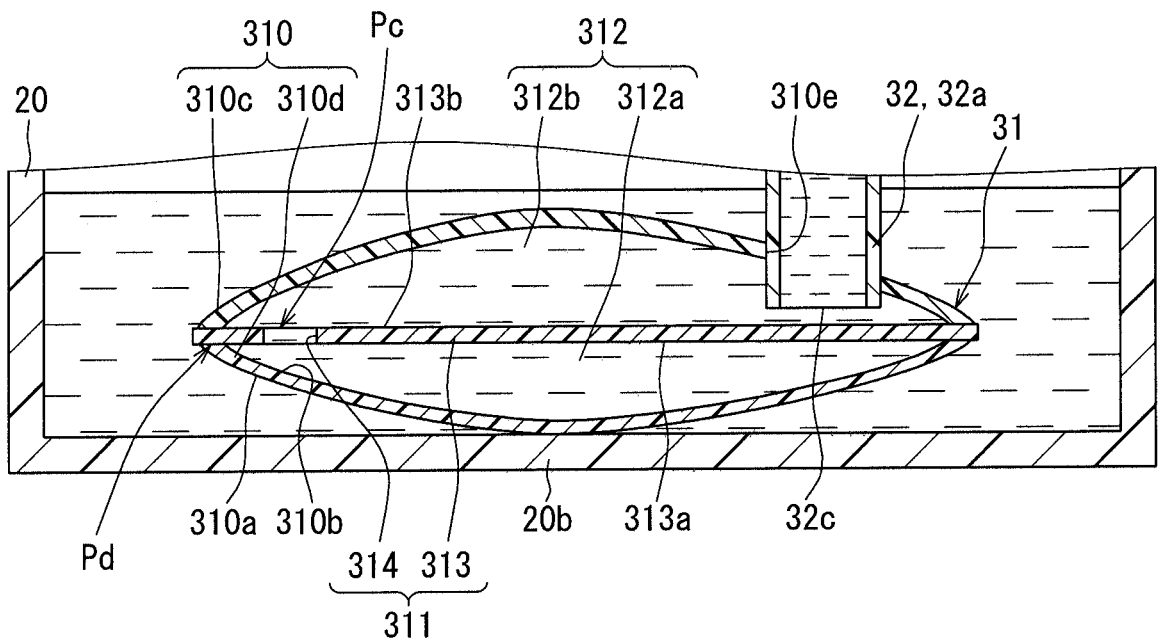
FIG. 12 is a cross-sectional view showing another modification of FIG. 2.

In a second modification of the first and second embodiments, as shown FIG. 12, the inside space 312 may be partitioned into the first space 312a at the lower side and the second space 312b at the upper side in the top-to-bottom direction by the partitioning portion 313, which is in a form of a diaphragm that does not have the through-hole 313c. Here, in the second modification shown in FIG. 12, in the imaginary state where the communication window 314 of the partitioning portion 313 is plugged to have the thickness that is the same as the thickness of the surrounding region of the partitioning portion 313, which is located at the outer periphery of the communication window 314, the volume of the first space 312a is smaller than the volume of the second space 312b. Here, it should be noted that FIG. 12 shows the second modification of the first embodiment. Alternatively, in the second modification, similar to the first and second embodiments, in the imaginary state where the communication window 314 of the partitioning portion 313 is plugged to have the thickness that is the same as the thickness of the surrounding region of the partitioning portion 313, which is located at the outer periphery of the communication window 314, the volume of the second space 312b may be set to be smaller than the volume of the first space 312a.

In a third modification, which relates to the first and second embodiments, similar to the first modification, in the imaginary state where the communication window 314 of the partitioning portion 313, 313 is plugged to have the thickness that is the same as the thickness of the surrounding region of the partitioning portion 313, 2313, which is located at the outer periphery of the communication window 314, the volume of the first space 312a may be set to be smaller than the volume of the second space 312b. In a fourth modification, which relates to the third embodiment, the communication window 2314, which is similar to the communication window 2314 of the second embodiment, may be used.

Figure 13:
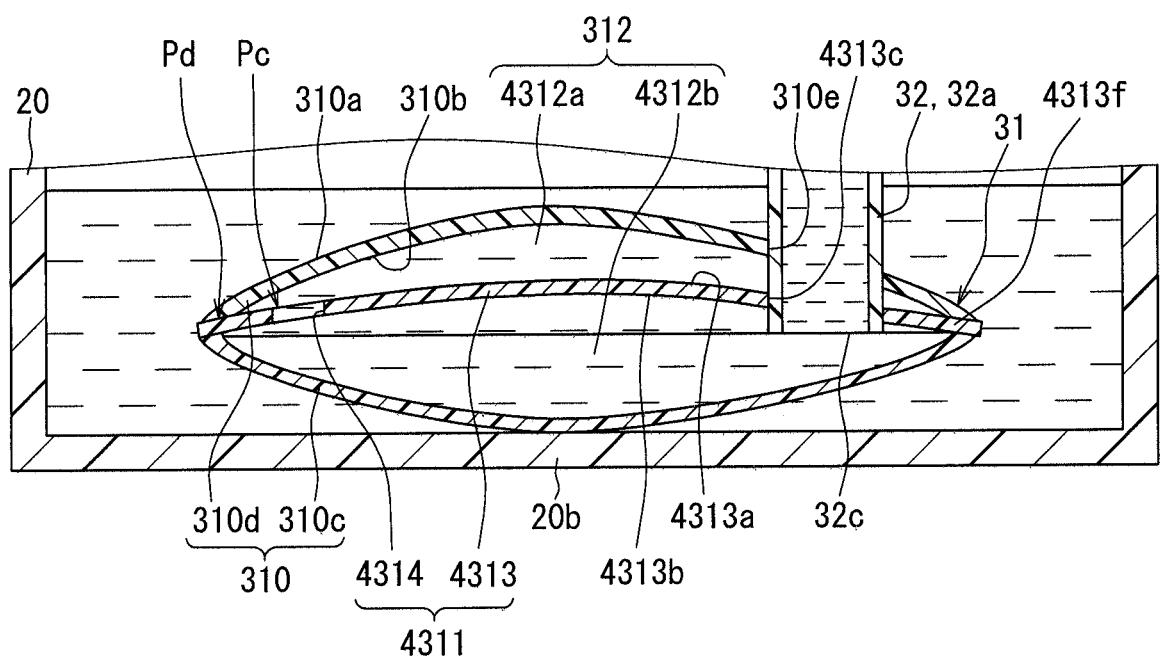
FIG. 13 is a cross-sectional view showing a modification of FIG. 8.
Figure 14:
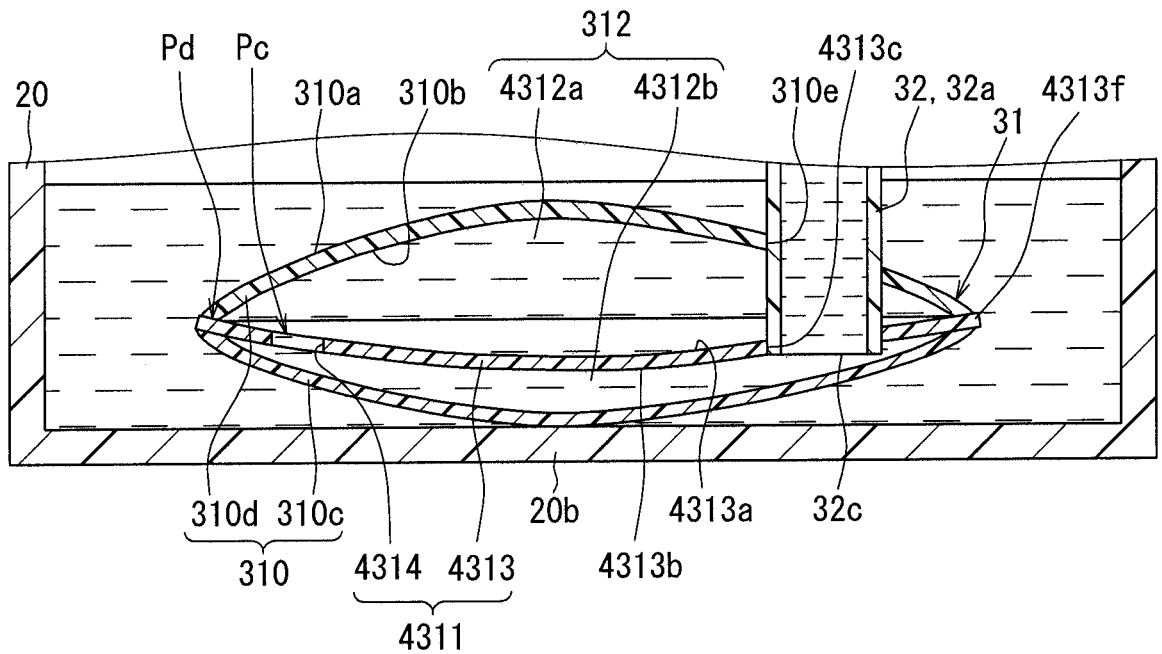
FIG. 14 is a cross-sectional view showing the modification of FIG. 8.

In a fifth modification, which relates to the fourth embodiment, as shown in FIGS. 13 and 14, the second space 4312b may be surrounded by an upper partition wall sheet 4313f, which serves as the partitioning portion 4313 and is in a form of a diaphragm that is curved upwardly or downwardly, and the lower filter sheet 310c of the filter element 310. With this surrounding form, the partitioning portion 4313 partially partitions the inside space 312 to form the first space 4312a at the upper side and the second space 4312b at the lower side. In the fifth modification shown in FIG. 13, similar the first modification, in the imaginary state where the communication window 4314 of the partitioning portion 4313 is plugged to have the thickness that is the same as the thickness of the surrounding region of the partitioning portion 4313, which is located at the outer periphery of the communication window 4314, the volume of the first space 4312a is smaller than the volume of the second space 4312b. In contrast, in the fifth modification shown in FIG. 14, similar to the first and second embodiments, in the imaginary state where the communication window 4314 of the partitioning portion 4313 is plugged to have the thickness that is the same as the thickness of the surrounding region of the partitioning portion 4313, which is located at the outer periphery of the communication window 4314, the volume of the second space 4312b is smaller than the volume of the first space 4312a.

Figure 15:
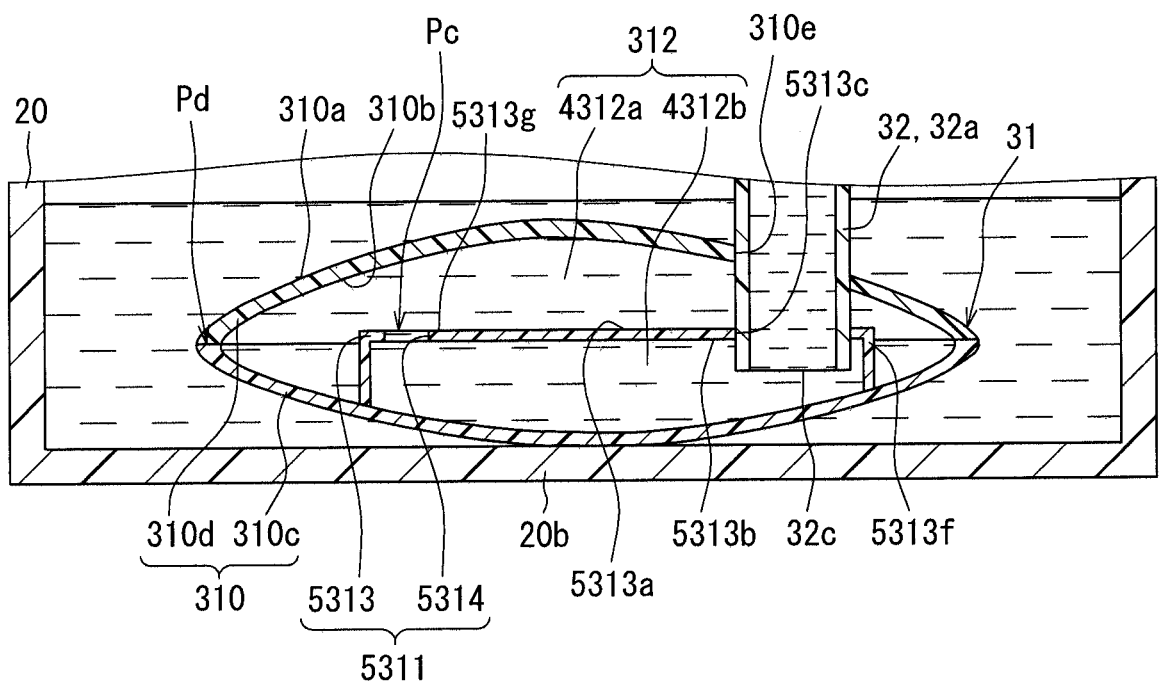
FIG. 15 is a cross-sectional view showing the modification of FIG. 10.

In a sixth modification, which relates to the fifth embodiment, as shown in FIG. 15, the upper partition wall member 5313f, which is shaped into a hollow inverted tubular form having a bottom (i.e., an inverted cup form) in the partitioning portion 5313 that does not have the lower partition wall member 5313e, may be joined to the lower filter sheet 310c of the filter element 310. Because of the above-described form of joint, the second space 4312b is surrounded by the partitioning portion 5313 and the filter element 310 such that in the imaginary state where the communication window 5314 of the partitioning portion 5313 is plugged to have the thickness that is the same as the thickness of the surrounding region of the partitioning portion 5313, which is located at the outer periphery of the communication window 5314, the volume of the second space 4312b is smaller than the volume of the first space 4312a. Furthermore, in the sixth modification, as shown in FIG. 15, the communication window 5314 is formed in a portion (e.g., the upper wall 5313g) of the upper partition wall member 5313f that serves as the partitioning portion 5313.

Figure 16:
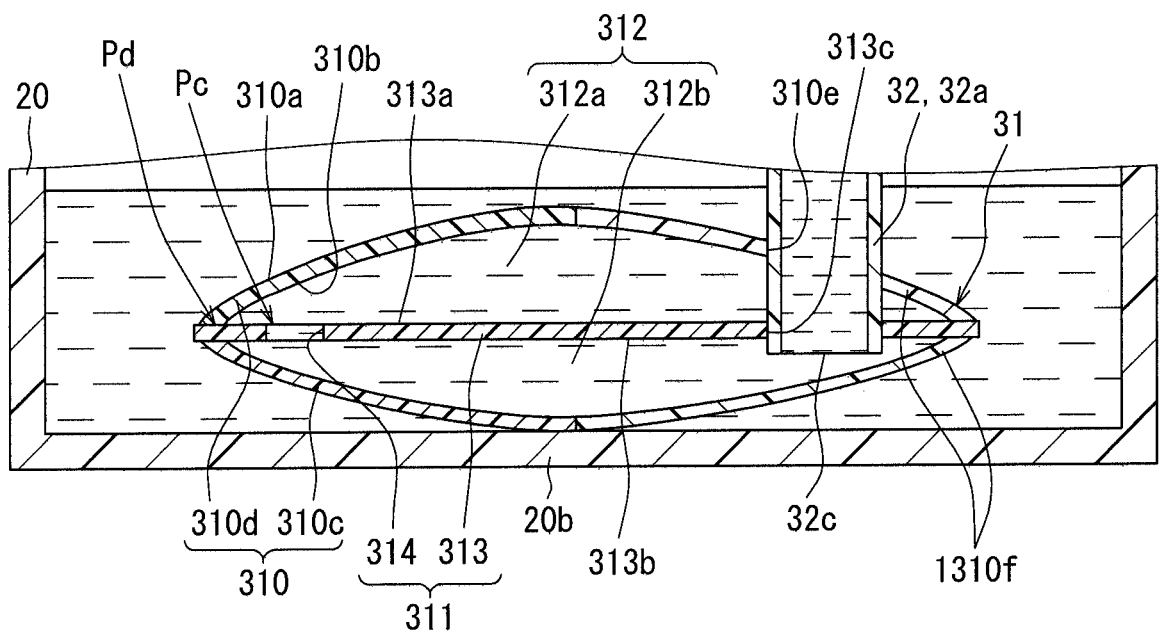
FIG. 16 is a cross-sectional view showing a further modification of FIG. 2.
Figure 17:
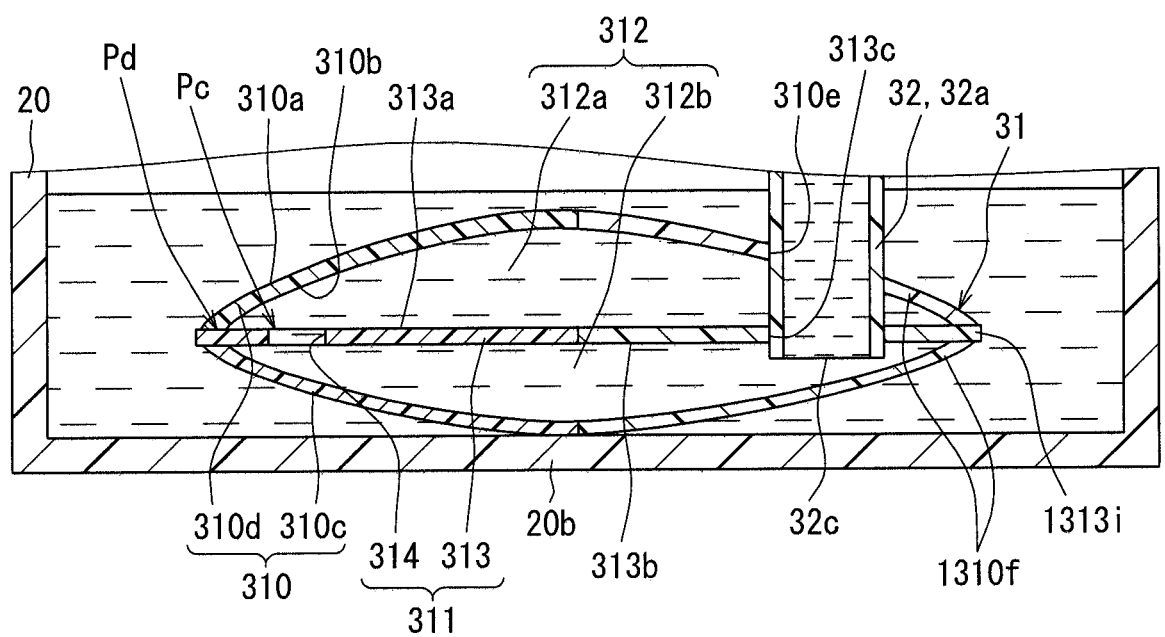
FIG. 17 is a cross-sectional view showing a further modification of FIG. 2.

In a seventh modification, which relates to the first to fifth embodiments, as shown in FIGS. 16 and 17, a portion 1310f of the hollow filter element 310 may be made of a material, such as rigid resin, which does not have the filtering function, in place of the material, which implements the filtering function. FIGS. 16 and 17 show the seventh modification of the first embodiment, in which the portion 1310f of each of the filter sheets 310c, 310d is made of the material that does not have the filtering function.

Figure 18:
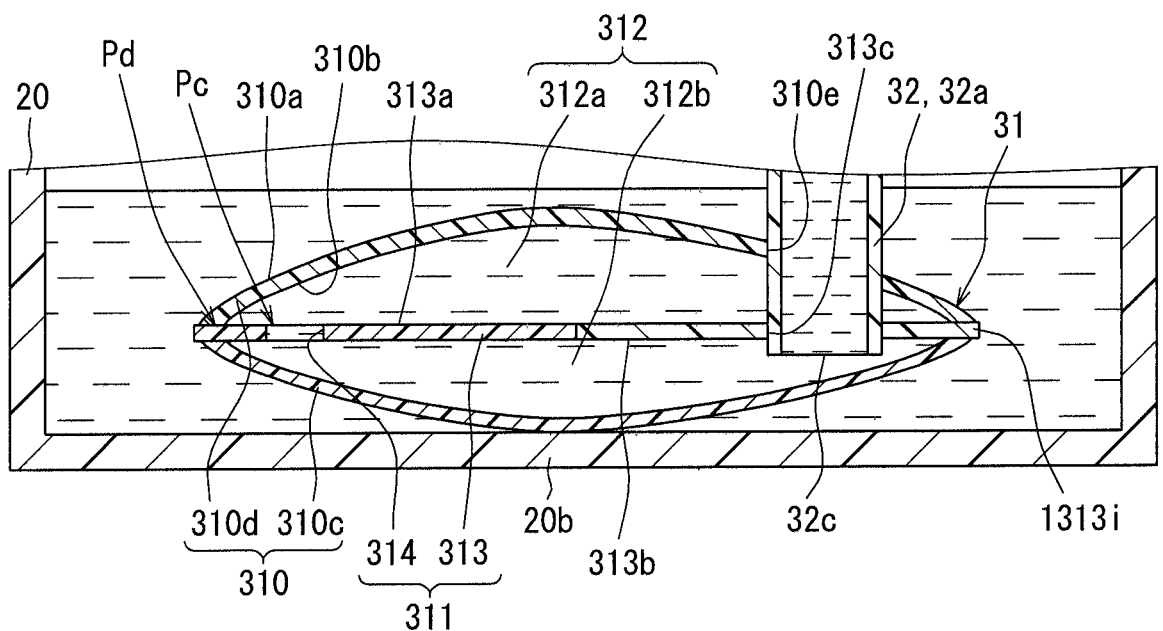
FIG. 18 is a cross-sectional view showing the further modification of FIG. 2.

In an eighth modification, which relates to the first to fourth embodiments, as shown in FIGS. 17 and 18, a portion 1313i of the partitioning portion 313, 2313, 3313, 4313 in the form of the diaphragm or the hollow form may be made of the material, such as the rigid resin, which does not have the filtering function, in place of the material, which implements the filtering function. Here, it should be noted that FIGS. 17 and 18 show the eighth modification of the first embodiment.

Figure 19:
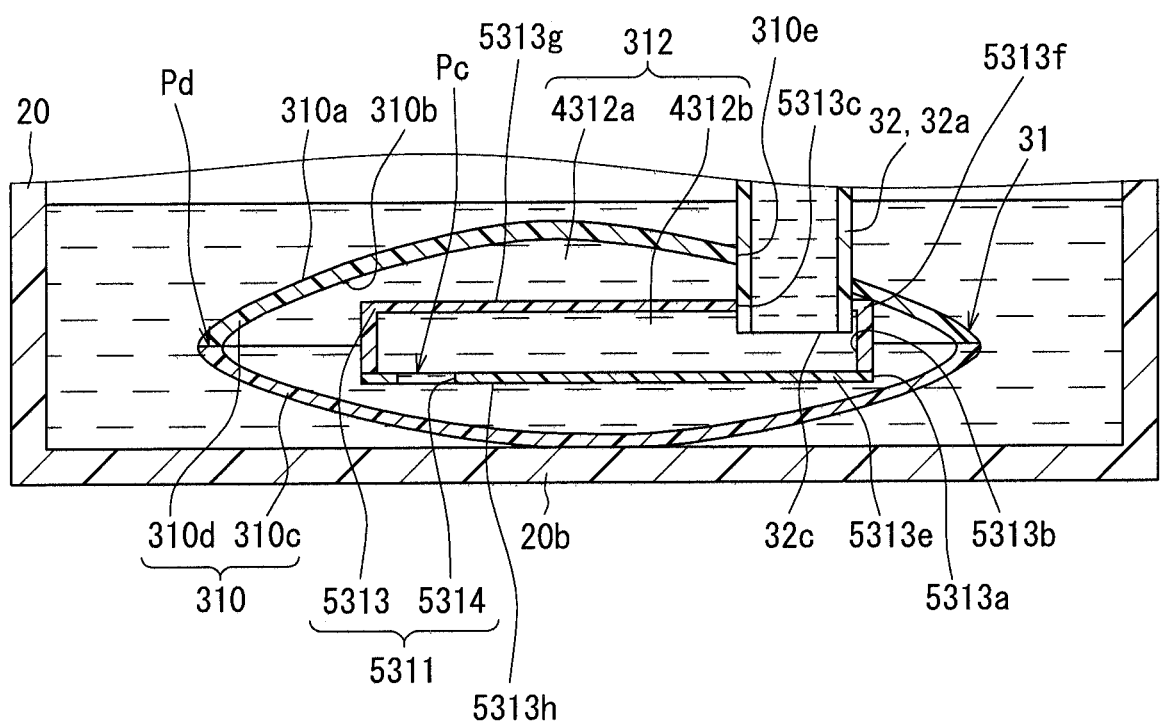
FIG. 19 is a cross-sectional view showing a further modification of FIG. 10.

In a ninth modification, which relates to the fifth embodiment, as shown in FIG. 19, one of the partition wall members 5313e, 5313f may be made of the material, such as the rigid resin, which does not have the filtering function, in place of the material, which implements the filtering function. Here, in the ninth modification shown in FIG. 19, the lower partition wall member 5313e, which is in the planar plate form, is made of the material, which implements the filtering function, and the upper partition wall member 5313f, which is in the hollow inverted tubular form having the bottom (i.e., the inverted cup form), is made of the material, which does not have the filtering function. In this case, the effective use of the filtered fuel, which is captured in the first space 4312a, is improved.

In a tenth modification, which relates to the first to fifth embodiments, the pore size of the pores, through which the filtered fuel passes, may be set to be smaller than the pore size of the pores, through which the stored fuel passes, at the filter element 310. In the tenth modification, even when the clogging of the pores of the partitioning portion 313, 2313, 3313, 4313, 5313, which has the small surface area and the small pore size, occurs, the filtered fuel of the first space 312a can be suctioned into the second space 312b, 4312b through the communication window 314, 2314, 4314, 5314 to enable the effective use of the filtered fuel of the first space 312a.

In an eleventh modification, which relates to the first to fifth embodiments, the structure, from which the sub-tank 20 is eliminated, may be used in the fuel supply device 1. In a twelfth modification, which relates to the first to fifth embodiments, the opening portion 32c of the suction inlet 32a of the fuel pump 32 in the second space 312b may be directed in another direction, such as the lateral direction, which is other than the downward direction.

Figure 20:
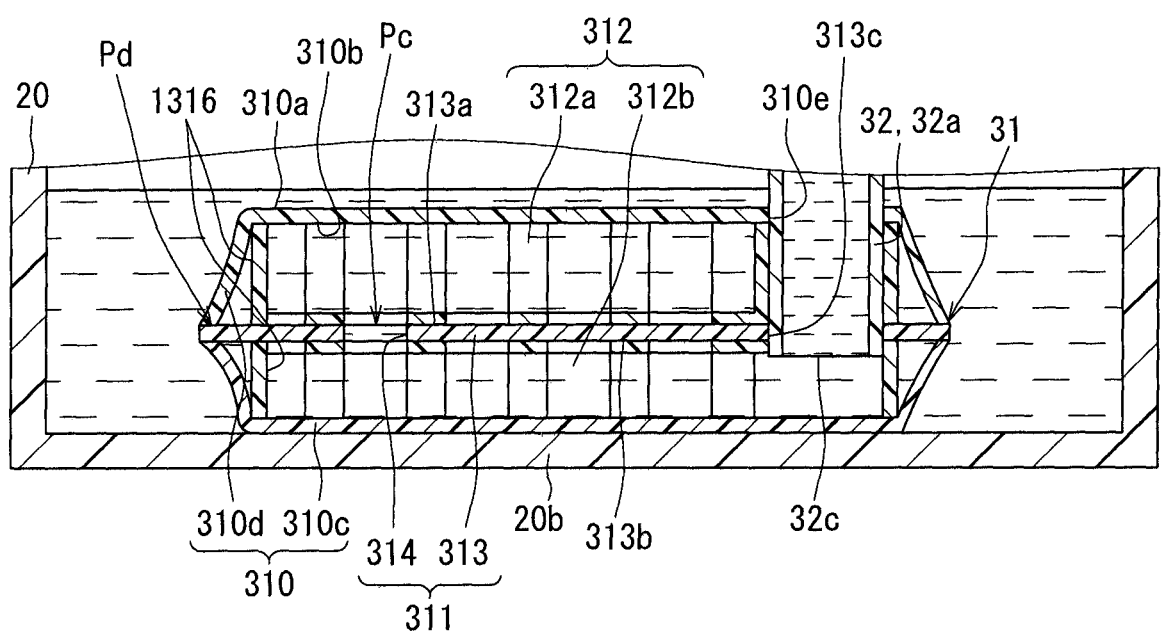
FIG. 20 is a cross-sectional view showing a further modification of FIG. 2.

In a thirteenth modification, which relates to the first to fifth embodiments, as shown in FIG. 20, a holding element 1316, which forms an endoskeleton of the suction filter 31, may be placed in the inside space 312 of the filter element 310. In the thirteenth modification shown in FIG. 20, the holding element 1316 is made of rigid resin and is shaped generally into a form of ribs. With the above-described configuration, the holding element 1316 holds the partition wall element 311 from two opposite sides in the top-to-bottom direction such that the surfaces 313a, 313b of the partitioning portion 313 are partially exposed. Additionally, the holding element 1316 projects toward the two opposite sides in the top-to-bottom direction at a plurality of locations to maintain the volume relationship between the first space 312a and the second space 312b, and thereby the holding element 1316 holds the filter sheets 310c, 310d of the filter element 310. Furthermore, the holding element 1316 is also installed to the suction inlet 32a to maintain the positional relationship of the opening portion 32c at the second space 312b. Here, it should be noted that FIG. 20 shows the thirteenth modification of the first embodiment.

The invention claimed is:

1. A suction filter for filtering fuel in an inside of a fuel tank of a vehicle and thereafter enabling suctioning of the filtered fuel into a suction inlet of a fuel pump, the suction filter comprising:
 a filter element to be installed in the inside of the fuel tank to filter stored fuel, which is stored in the fuel tank, by passing the stored fuel into an inside space of the filter element; and
 a partition wall element that is exposed in the inside space, wherein the partition wall element includes:
  a partitioning portion that is placed to partially partition the inside space into a first space, into which filtered fuel filtered through the filter element is supplied, and a second space, in which the suction inlet for suctioning the filtered fuel opens, wherein the partitioning portion is made of a permeable filter material that permits the filtered fuel from the first space to flow to the second space through the partitioning portion; and
  a communication window that is formed in the partitioning portion at a location, which is offset to a side that is away from the suction inlet, wherein the communication window communicates between the first space and the second space while bypassing the partitioning portion.

2. The suction filter according to claim 1, wherein the partitioning portion is arranged in a form of a diaphragm that partially partitions the inside space to form the first space and the second space.

3. The suction filter according to claim 2, wherein the partitioning portion is arranged in the form of the diaphragm that partially partitions the inside space to form the first space, which is located on an upper side of the diaphragm, and the second space, which is located on a lower side of the diaphragm.

4. The suction filter according to claim 3, wherein the partitioning portion, which is flexible, is arranged in a relaxed state, in which the second space is expandable and contractible with the partitioning portion.

5. The suction filter according to claim 1, wherein the partitioning portion is formed into a hollow form while the partitioning portion is exposed in the first space located on an outer side of the partitioning portion and surrounds the second space located on an inner side of the partitioning portion.

6. The suction filter according to claim 1, wherein the second space is surrounded by the partitioning portion and the filter element.

7. The suction filter according to claim 6, wherein a volume of the second space is smaller than a volume of the first space.

8. The suction filter according to claim 1, wherein a pore size of respective pores of the partitioning portion, through which the filtered fuel passes, is set to be equal to or larger than a pore size of respective pores of the filter element, through which the stored fuel passes.

9. A fuel supply device for supplying fuel from an inside of a fuel tank of a vehicle to an outside of the fuel tank, the fuel supply device comprising:
 a fuel pump that includes a suction inlet and discharges fuel, which is suctioned into the suction inlet in the inside of the fuel tank, toward the outside of the fuel tank; and
 a suction filter for filtering fuel in an inside of the fuel tank of the vehicle and thereafter enabling suctioning of the filtered fuel into the suction inlet of the fuel pump, the suction filter comprising:
  a filter element to be installed in the inside of the fuel tank to filter stored fuel, which is stored in the fuel tank, by passing the stored fuel into an inside space of the filter element, and
  a partition wall element that is exposed in the inside space, wherein the partition wall element includes:
   a partitioning portion that is placed to partially partition the inside space into a first space, into which filtered fuel filtered through the filter element is supplied, and a second space, in which the suction inlet for suctioning the filtered fuel opens, wherein the partitioning portion is made of a permeable filter material that permits the filtered fuel from the first space to flow to the second space through the partitioning portion, and
   a communication window that is formed in the partitioning portion at a location, which is offset to a side that is away from the suction inlet, wherein the communication window communicates between the first space and the second space while bypassing the partitioning portion.

* * * * *